(12) United States Patent
Bailey et al.

(10) Patent No.: US 11,686,894 B2
(45) Date of Patent: Jun. 27, 2023

(54) CANOPY LUMINAIRE

(71) Applicant: HLI Solutions, Inc., Greenville, SC (US)

(72) Inventors: Christopher Bailey, Greenville, SC (US); Ezekial Thomas Hill, III, Spartanburg, SC (US)

(73) Assignee: HLI Solutions, Inc., Greenville, SC (US)

( * ) Notice: Subject to any disclaimer, the term of this patent is extended or adjusted under 35 U.S.C. 154(b) by 0 days.

(21) Appl. No.: 17/707,249

(22) Filed: Mar. 29, 2022

(65) Prior Publication Data

US 2022/0221642 A1 Jul. 14, 2022

Related U.S. Application Data

(62) Division of application No. 17/016,844, filed on Sep. 10, 2020, now Pat. No. 11,287,558.

(Continued)

(51) Int. Cl.
*F21V 8/00* (2006.01)
*F21V 17/10* (2006.01)
(Continued)

(52) U.S. Cl.
CPC ............ *G02B 6/0035* (2013.01); *F21S 8/043* (2013.01); *F21V 17/10* (2013.01); *F21V 23/003* (2013.01);
(Continued)

(58) Field of Classification Search
CPC ........ F21S 8/043; F21V 17/10; F21V 23/003; F21V 23/047; G02B 6/0035; G02B 6/0055
See application file for complete search history.

(56) References Cited

U.S. PATENT DOCUMENTS

| 6,648,486 | B2 | 11/2003 | Harbers et al. |
| 7,237,939 | B2 | 7/2007 | Kim et al. |

(Continued)

FOREIGN PATENT DOCUMENTS

| DE | 102011016435 A1 | 10/2012 | |
| EP | 2982899 A1 * | 2/2016 | ............... F21S 8/00 |
| WO | WO-2014038117 A1 * | 3/2014 | ............... F21S 8/04 |

OTHER PUBLICATIONS

Machine translation of EP2982899 (Year: 2016).*

(Continued)

*Primary Examiner* — Leah Simone Macchiarolo
(74) *Attorney, Agent, or Firm* — Michael Best & Friedrich LLP

(57) ABSTRACT

A luminaire includes a housing, a light diffusion panel, a reflective surface, and a plurality of light sources. The light diffusion panel includes a light source aperture, an edge surface bounding the light source aperture, and an emission surface. The emission surface includes first and second emission surface sections. The second emission surface section is disposed on an opposite side of the light source aperture from the first emission surface section. The reflective surface is disposed on a side of the light diffusion panel opposite the emission surface. The light sources project light into the light diffusion panel through the edge surface. The light sources include first and second light sources. The first light source projects light into the light diffusion panel and through the first emission surface section. The second light source projects light into the light diffusion panel and through the second emission surface section.

10 Claims, 19 Drawing Sheets

Related U.S. Application Data

(60) Provisional application No. 62/911,718, filed on Oct. 7, 2019, provisional application No. 62/898,480, filed on Sep. 10, 2019.

(51) Int. Cl.
  *F21V 23/04* (2006.01)
  *F21S 8/04* (2006.01)
  *F21V 23/00* (2015.01)

(52) U.S. Cl.
  CPC ........ *F21V 23/0471* (2013.01); *G02B 6/0055* (2013.01); *G02B 6/0076* (2013.01)

(56) References Cited

U.S. PATENT DOCUMENTS

| | | | |
|---|---|---|---|
| 8,864,360 B2* | 10/2014 | Parker | G02B 6/0085 362/616 |
| 9,004,722 B2* | 4/2015 | Sampsell | F21V 29/67 362/555 |
| 9,091,411 B2 | 7/2015 | Huang | |
| 9,335,464 B2 | 5/2016 | Grigore | |
| 9,618,678 B1* | 4/2017 | Tickner | G02B 6/00 |
| 9,666,744 B2 | 5/2017 | Clements | |
| 10,168,467 B2 | 1/2019 | Tarsa et al. | |
| 10,180,529 B2 | 1/2019 | Ohno et al. | |
| 10,309,588 B2 | 6/2019 | Tyukhova et al. | |
| 10,830,941 B2 | 11/2020 | Deflandre et al. | |
| 10,845,529 B2 | 11/2020 | Diana et al. | |
| 11,029,008 B2* | 6/2021 | Boomgaarden | G09F 13/005 |
| 11,287,558 B2 | 3/2022 | Bailey et al. | |
| 2005/0281040 A1 | 12/2005 | Birman et al. | |
| 2006/0120110 A1 | 6/2006 | Lin et al. | |
| 2008/0062116 A1 | 3/2008 | Morbieu et al. | |
| 2009/0067178 A1 | 3/2009 | Huang et al. | |
| 2009/0129121 A1* | 5/2009 | Yoneda | G01N 21/8806 362/628 |
| 2009/0180282 A1 | 7/2009 | Aylward et al. | |
| 2010/0277097 A1 | 11/2010 | Maxik | |
| 2011/0063855 A1 | 3/2011 | Vissenberg | |
| 2011/0227895 A1 | 9/2011 | Takahashi et al. | |
| 2012/0014128 A1* | 1/2012 | Lin | F21V 29/78 362/580 |
| 2012/0113676 A1 | 5/2012 | Van Dijk et al. | |
| 2012/0281432 A1* | 11/2012 | Parker | F21V 7/00 362/609 |
| 2013/0003409 A1* | 1/2013 | Vissenberg | G02B 6/0018 362/609 |
| 2013/0050831 A1 | 2/2013 | Hu et al. | |
| 2013/0114292 A1 | 5/2013 | Brick et al. | |
| 2014/0192553 A1 | 7/2014 | Liu et al. | |
| 2014/0211496 A1* | 7/2014 | Durkee | F21S 8/04 362/555 |
| 2015/0277016 A1 | 10/2015 | Shi | |
| 2017/0322364 A1 | 11/2017 | Girotto et al. | |
| 2018/0074249 A1 | 3/2018 | Hirasawa | |
| 2018/0210120 A1 | 7/2018 | DiTrapani et al. | |
| 2019/0377128 A1* | 12/2019 | Diana | G02B 6/0068 |
| 2020/0073046 A1* | 3/2020 | Kim | F21V 7/0016 |
| 2022/0026620 A1* | 1/2022 | Creasman | G02B 6/0063 |

OTHER PUBLICATIONS

Machine translation of WO2014038117 (Year: 2014).*
International Search Report and Written Opinion for Application No. PCT/US2020/050106 dated Nov. 30, 2020 (9 pages).
International Search Report and Written Opinion for Application No. PCT/US2021/012256 dated Mar. 19, 2021 (8 pages).

* cited by examiner

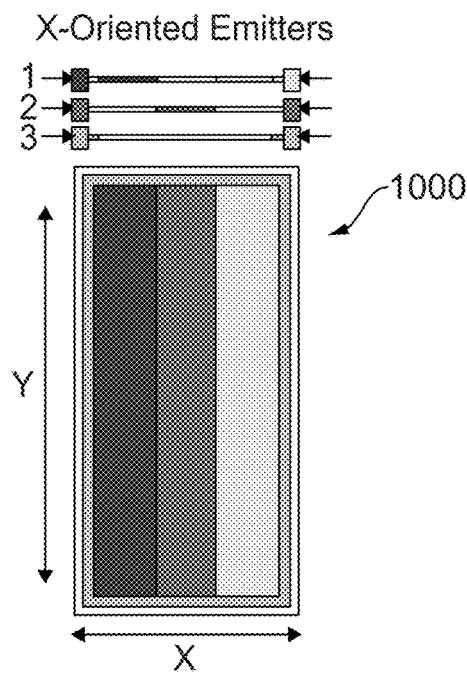

| Optical Layer | Function 1 | Function 2 | Photometric | Brightness |
|---|---|---|---|---|
| 1 | Ambient Lighting | Dynamic CCT / SPD | Distribution 1 | Moderate (adjustable) |
| 2 | Task / Exam | Reading | Distribution 2 | High (adjustable) |
| 3 | Nightlight | Indication | Distribution 3 | Low (adjustable) |

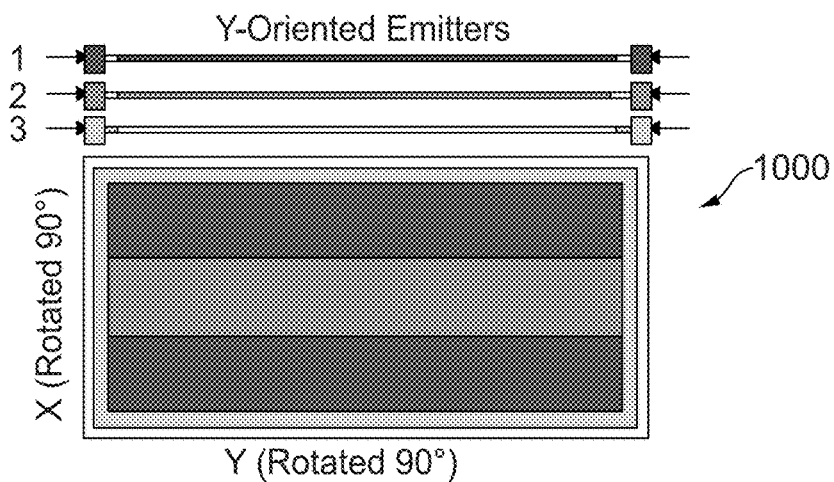

| Optical Layer | Function 1 | Function 2 | Photometric | Brightness |
|---|---|---|---|---|
| 1 | Antimicrobial | N/A | Distribution 1 | Moderate (adjustable) |
| 2 | Task / Exam | Reading | Distribution 2 | High (adjustable) |
| 3 | Nightlight | Indication | Distribution 3 | Low (adjustable) |

*FIG. 19*

CANOPY LUMINAIRE

RELATED APPLICATIONS

This application is a divisional of U.S. patent application Ser. No. 17/016,844, filed Sep. 10, 2020, which claims the benefit of U.S. Provisional Patent Application No. 62/898,480, filed Sep. 10, 2019, and U.S. Provisional Application No. 62/911,718, filed Oct. 7, 2019, the entire contents of which are hereby incorporated by reference.

FIELD

Embodiments described herein relate to a canopy luminaire for projecting light toward, for instance, a vehicle bay.

SUMMARY

The present disclosure relates, in one aspect, to a luminaire including a housing, a light diffusion panel, a reflective surface, and a plurality of light sources. The light diffusion panel is disposed in the housing. The light diffusion panel includes a light source aperture, an edge surface bounding the light source aperture, and an emission surface. The emission surface includes a first emission surface section and a second emission surface section. The second emission surface section is disposed on an opposite side of the light source aperture from the first emission surface section. The reflective surface is disposed on a side of the light diffusion panel opposite the emission surface. The plurality of light sources project light into the light diffusion panel through the edge surface. The plurality of light sources includes a first light source and a second light source. The first light source projects light into the light diffusion panel and out of the light diffusion panel through the first emission surface section. The second light source projects light into the light diffusion panel and out of the light diffusion panel through the second emission surface section.

The present disclosure relates, in another aspect, to a luminaire including a housing, a first light diffusion panel, a second light diffusion panel, a first reflective surface, a second reflective surface, a first panel light source, and a second panel light source. The first light diffusion panel is disposed in the housing. The first light diffusion panel includes a first panel outer periphery and a first panel emission surface. The second light diffusion panel is also disposed in the housing. The second light diffusion panel includes a second panel outer periphery and a second panel emission surface. The first reflective surface is disposed on a side of the first light diffusion panel opposite the first panel emission surface. The second reflective surface is disposed on a side of the second light diffusion panel opposite the second panel emission surface. The second reflective surface is also disposed between the first light diffusion panel and the second light diffusion panel. The first panel light source projects light into the first light diffusion panel through the first panel outer periphery and out of the first light diffusion panel through the first panel emission surface. The second panel light source projects light into the second light diffusion panel through the second panel outer periphery and out of the second light diffusion panel through the second panel emission surface.

The present disclosure relates, in another aspect, to a system for indicating a status of a vehicle bay. The system includes a luminaire, a sensor, and a controller. The luminaire includes a first light diffusion panel, a first panel light source, a second light diffusion panel, and a second panel light source. The first light diffusion panel has a first transition zone and a first extraction zone. The first transition zone guides light to the first extraction zone. The first extraction zone includes optical features. The first panel light source projects light having a first characteristic. The light projects into the first light diffusion panel, through the first transition zone, and out of the first light diffusion panel through the first extraction zone. The second light diffusion panel has a second transition zone and a second extraction zone. The second transition zone guides light to the second extraction zone. The second extraction zone includes optical features. The second panel light source projects light having a second characteristic that is different from the first characteristic. The light projects into the second light diffusion panel, through the second transition zone, and out of the second light diffusion panel through the second extraction zone. The sensor detects an object in the vehicle bay. The controller is operatively coupled to the first panel light source, the second panel light source, and the sensor. The controller receives one or more signals from the sensor, determines whether the object is in the vehicle bay, and illuminates the first and second panel light sources. If the object is determined to be in the vehicle bay, the controller illuminates the first panel light source. If the object is determined not to be in the vehicle bay, the controller illuminates the second panel light source.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 19 illustrates a bottom plan view of examples of a luminaire, according to embodiments described herein.

DETAILED DESCRIPTION

FIGS. 1-7 illustrate a luminaire 100. The luminaire includes a housing 102. The housing 102 can be made of, for example, die-cast aluminum low-copper material. The housing 102 at least partially contains a light diffusion panel 104, which may also be referred to as a light guide or a light guide plate. In some embodiments, the light diffusion panel 104 is a flat or planar structure. In other embodiments, the light diffusion panel 104 may be curved or some other shape. The light diffusion panel 104 can be made of an optically transmissive material such as, for example, clear acrylic.

Figure 1:
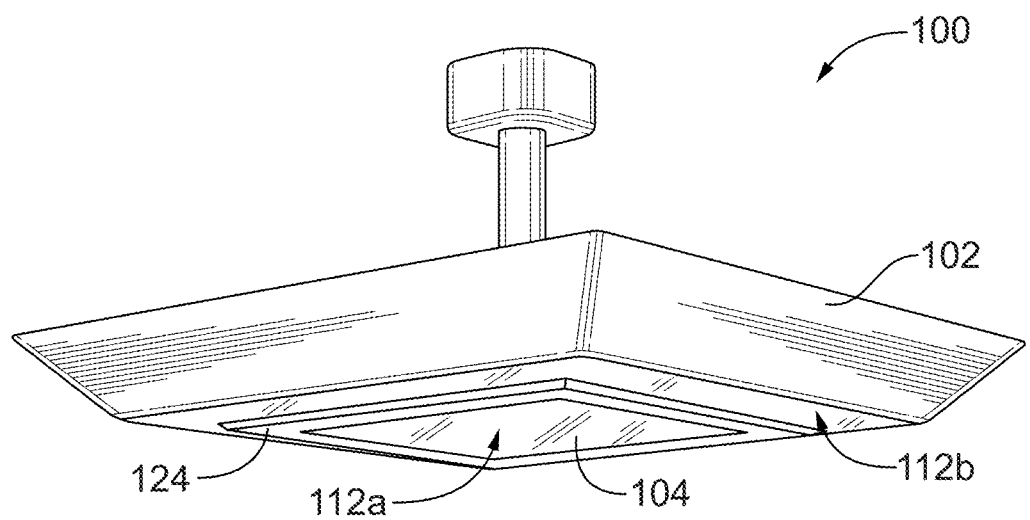
FIG. 1 illustrates a side/bottom perspective view of a luminaire, according to embodiments described herein.
Figure 2:
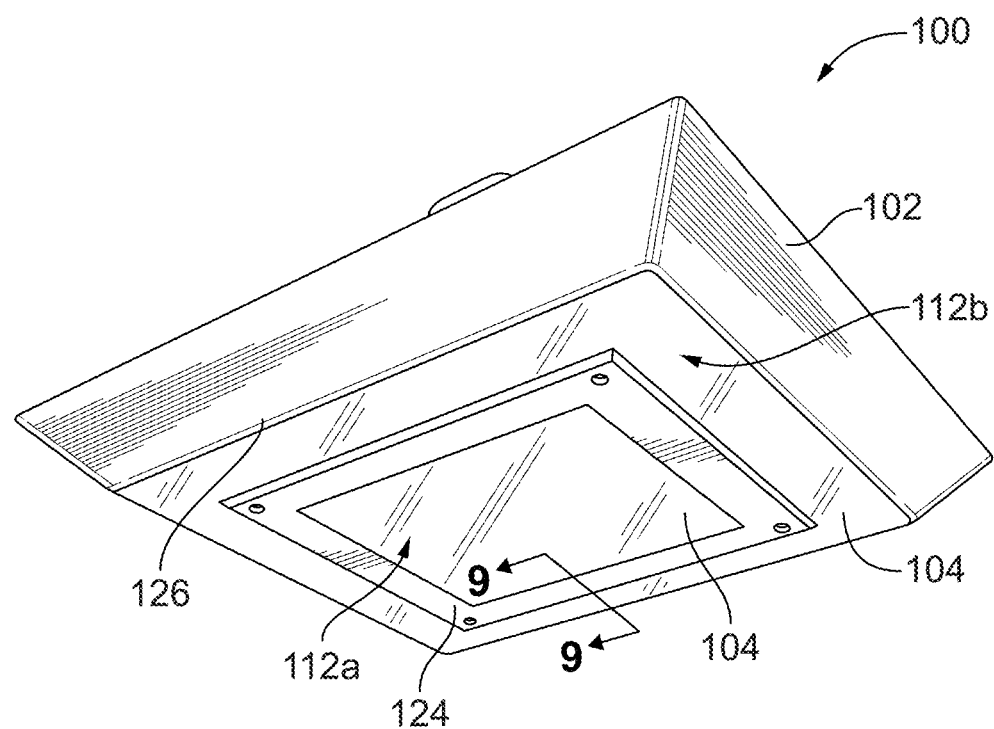
FIG. 2 illustrates a bottom perspective view of the luminaire of FIG. 1.
Figure 3:
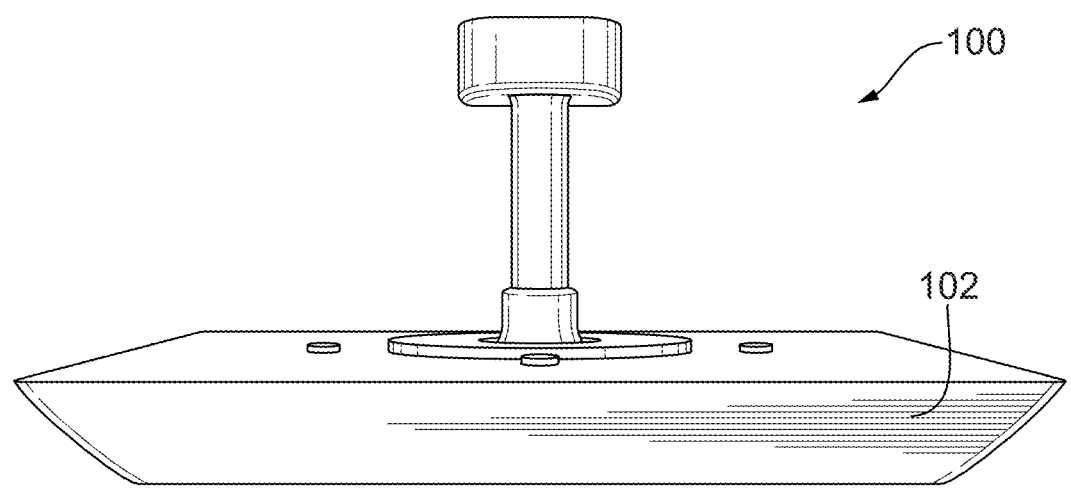
FIG. 3 illustrates a side/top perspective view of the luminaire of FIG. 1.
Figure 4:
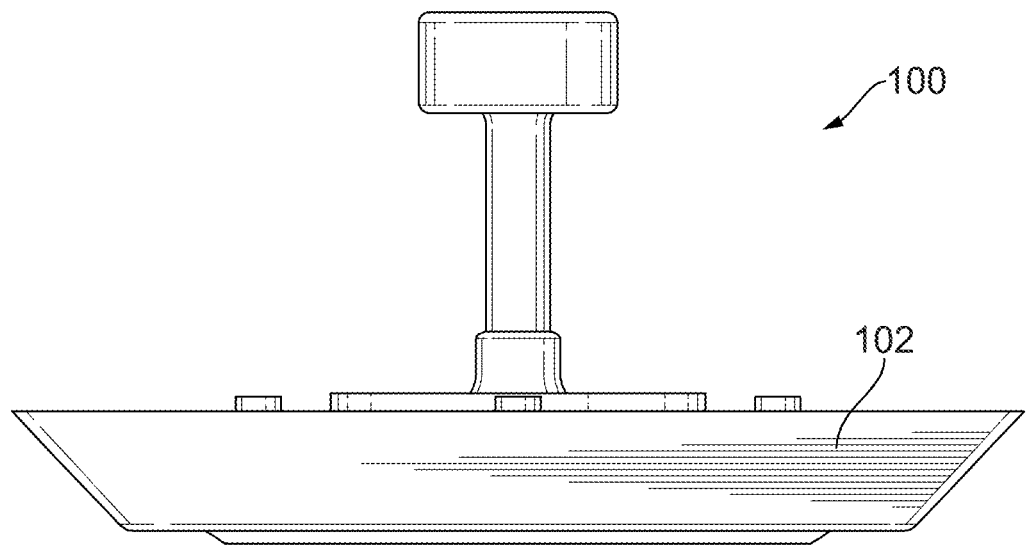
FIG. 4 illustrates a side elevation view of the luminaire of FIG. 1.
Figure 5:
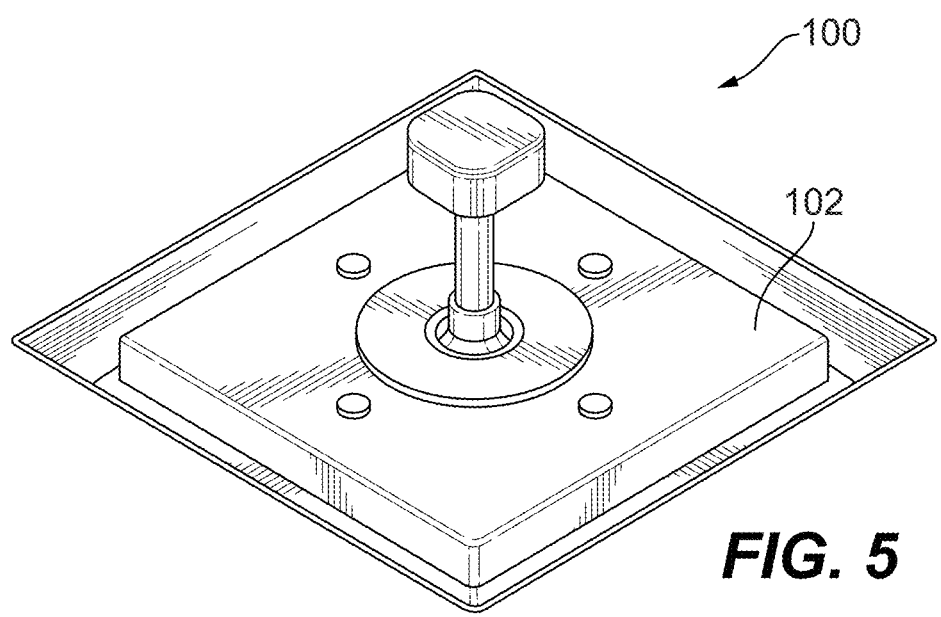
FIG. 5 illustrates a top perspective view of the luminaire of FIG. 1.
Figure 6:
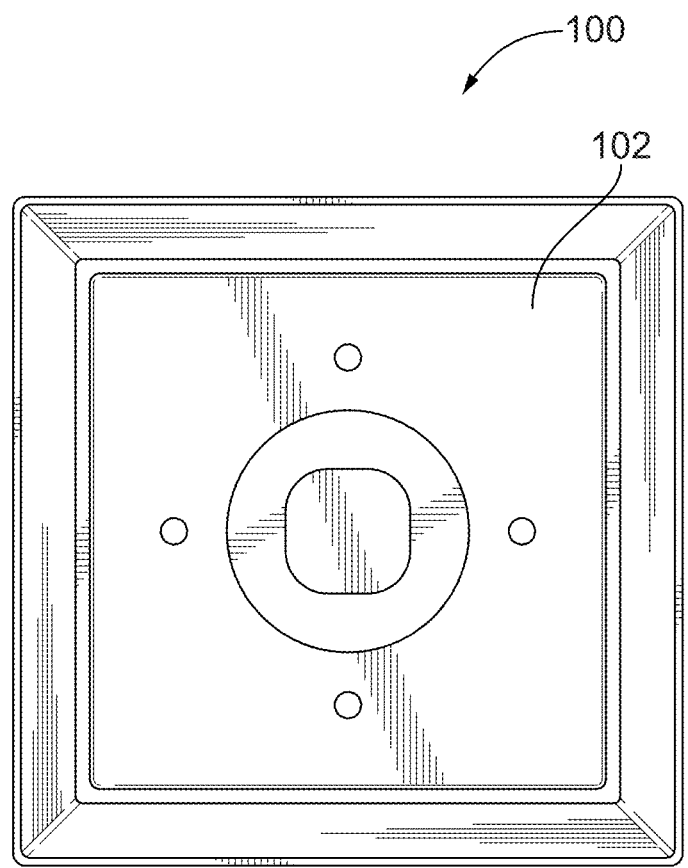
FIG. 6 illustrates a top plan view of the luminaire of FIG. 1.
Figure 7:
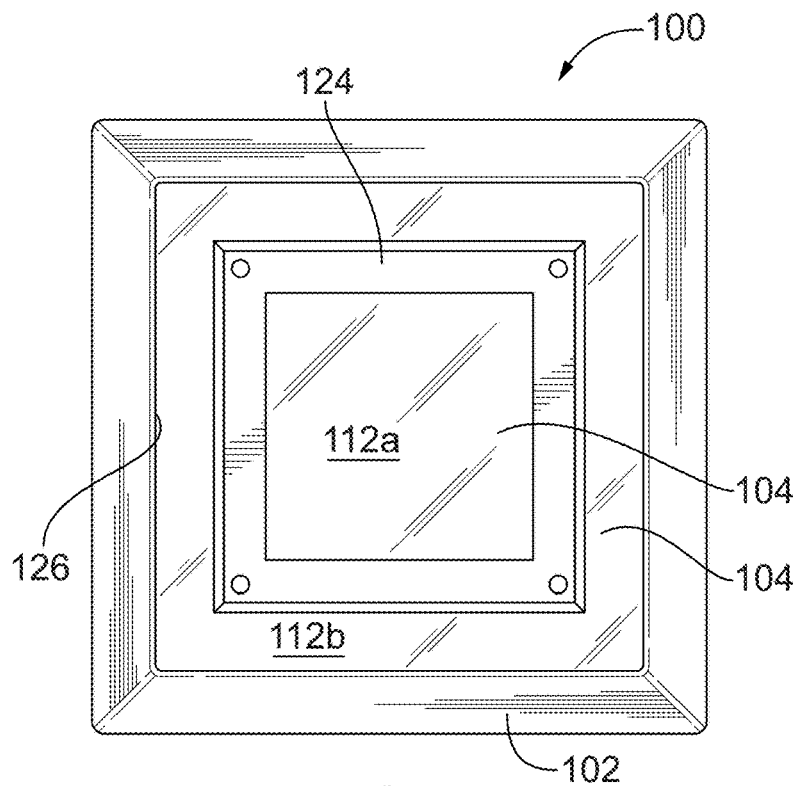
FIG. 7 illustrates a bottom plan view of the luminaire of FIG. 1.
Figure 8:
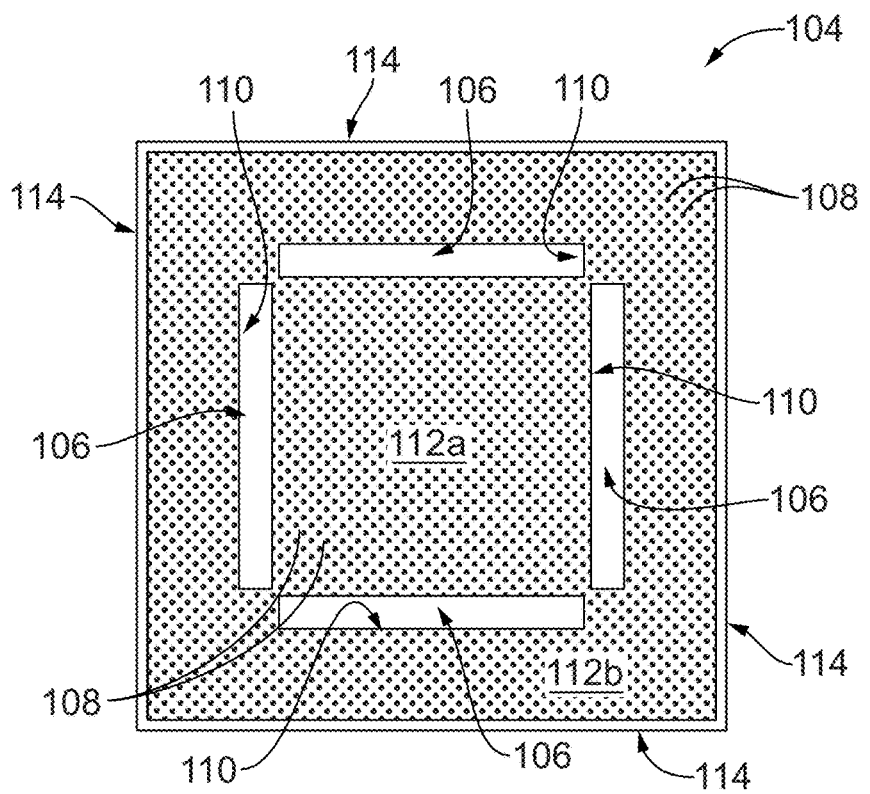
FIG. 8 illustrates a bottom plan view of a light diffusion panel of the luminaire of FIG. 1.

As shown in FIG. 8, some embodiments of the light diffusion panel 104 include at least one light source aperture 106. The light diffusion panel 104 also includes, in some embodiments, laser-engraved or otherwise manufactured optical features 108. These optical features 108 (which may also be referred to as extraction features) may be in the form of surface treatment (which may also be referred to as surface features) of the light diffusion panel 104, or may be within the light diffusion panel 104. The optical features 108 can form what may be referred to as extraction zones. The optical features 108 can be implemented in a uniform or a non-uniform manner. The optical features 108 may be formed with, for instance, injection molding, vacuum forming, three-dimensional printing, application of a laminated film, embossing, engraving, etching, or the like. The optical features 108 are shown in FIG. 8 as a plurality of dots.

Figure 9:
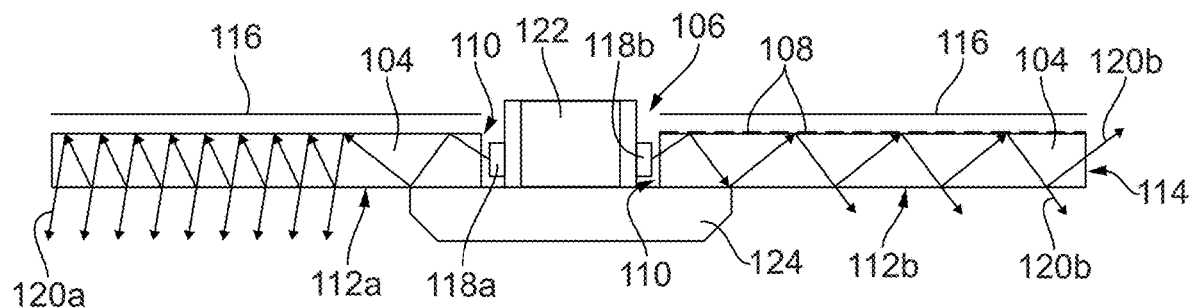
FIG. 9 illustrates a partial cross-sectional view of the luminaire of FIG. 1.

In the exemplary embodiment shown in FIG. 9, the light diffusion panel 104 including the light source aperture 106 is bordered by an edge surface 110. The edge surface 110 is shown as a vertical wall of the light diffusion panel 104 surrounding the centrally located light source aperture 106. The light diffusion panel 104 further includes an emission surface 112, which is shown in a plan view in FIG. 8 and is shown as being perpendicular to the edge surface 110 in FIG. 9. The emission surface 112 includes a first emission surface section 112a, which is illustrated as the central square section bordered by the four light source apertures 106 in the embodiment of FIG. 8. The emission surface 112 also includes a second emission surface section 112b, which is illustrated as the bordering outer section positioned between the light source apertures 106 and the outer periphery 114 of the light diffusion panel 104 in the embodiment of FIG. 8. Although the optical features 108 are illustrated similarly in both the first and second emission surface sections 112a, 112b, other embodiments contemplated herein include different optical features between the emission surface sections 112a, 112b.

As shown in FIG. 9, some embodiments include a reflective surface 116 disposed in the housing 102 adjacent the light diffusion panel 104 (illustrated as being above the light diffusion panel 104). This reflective surface 116 is positioned opposite the light diffusion panel 104 from the emission surface 112. The reflective surface 116 may be affixed to the housing 102, a surface of the housing 102 itself, affixed to the light diffusion panel 104, trapped between the housing 102 and the light diffusion panel 104, or the like. The reflective surface 116 may be included to improve system efficacy and may be applied onto or adjacent to the surface of the light diffusion panel 104 that is opposite the emission surface 112. The reflective surface 116 may be a reflector, diffuse reflective material, specular reflective material, or the like.

Also shown in FIG. 9, a plurality of light sources 118 projects light 120 into the light diffusion panel 104 through the edge surface 110 of the light diffusion panel 104. At least one light source 118 is mounted in relatively close proximity to an edge (such as the edge surface 110) of the light diffusion panel 104 in such a way that the light 120 is at least partially transmitted into the light diffusion panel 104. The plurality of light sources 118 includes a first light source 118a projecting light 120a into the light diffusion panel 104 and out of the light diffusion panel 104 through the first emission surface section 112a. The plurality of light sources 118 also includes a second light source 118b projecting light 120b into the light diffusion panel 104 and out of the light diffusion panel 104 through the second emission surface section 112b. In some embodiments, the plurality of light sources 118 includes multiple light emitting diodes (LEDs). The LEDs 118 may be brighter on the first emission surface section 112a side than on the second emission surface section 112b side or vice versa. In other embodiments, the brightness is controlled with features of the light diffusion panel 104 in addition to, or as an alternative to, the difference in LED brightness.

In some embodiments, the plurality of light sources 118 includes the first light source 118a configured to emit white light and the second light source 118b configured to emit light of a particular color (red, blue, green, or the like) or vice versa. In some embodiments, the plurality of light sources 118 includes more than one first light source 118a and more than one second light source 118b. In such embodiments, some of the first light sources 118a may be configured to emit white light while others of the first light sources 118a may be configured to emit light of a particular color. Likewise, some of the second light sources 118b may be configured to emit white light while others of the second light sources 118b may be configured to emit light of a particular color. In some embodiments, however, all of the first light sources 118a may be configured to emit white light and all of the second light sources 118b may be configured to emit light of a particular color or vice versa. The light sources 118 configured to emit light of a particular color in any of the above embodiments may include some light sources 118 configured to emit one particular color (such as red), other light sources 118 configured to emit another particular color (such as blue), and so on.

Also shown in the embodiment of FIG. 9, the plurality of light sources 118 are disposed in the light source aperture 106. The light sources 118 are mounted to a frame 122 which is coupled to the housing 102. The frame 122 can also include a support flange 124 which supports the light diffusion panel 104 alone or in combination with an outer edge 126 of the housing 102 (shown in FIGS. 2 and 7). In some embodiments, the frame 122 includes one or more sensors 128 (shown in FIG. 16 and described in more detail below). The sensors 128 may be disposed on or in the housing 102, or may be placed remotely from the housing 102. The sensors 128 include, for instance, light detection and ranging (LiDAR) sensors, ultrasonic sensors, induction coil sensors, weight sensors, motion sensors, temperature sensors, or the like. Additionally or alternatively, the luminaire 100 may include one or more actuators, one or more electronic interfaces, one or more mechanical interfaces, or the like.

Also shown in the embodiment of FIG. 9, the light diffusion panel 104 may be configured such that at least some of the light 120b is reflected internally until it passes through the outer periphery 114 of the light diffusion panel 104. Depending on the shape of the housing 102, this outer periphery light 120b can function as recessed lighting for the luminaire 100 in some embodiments.

Figure 10:
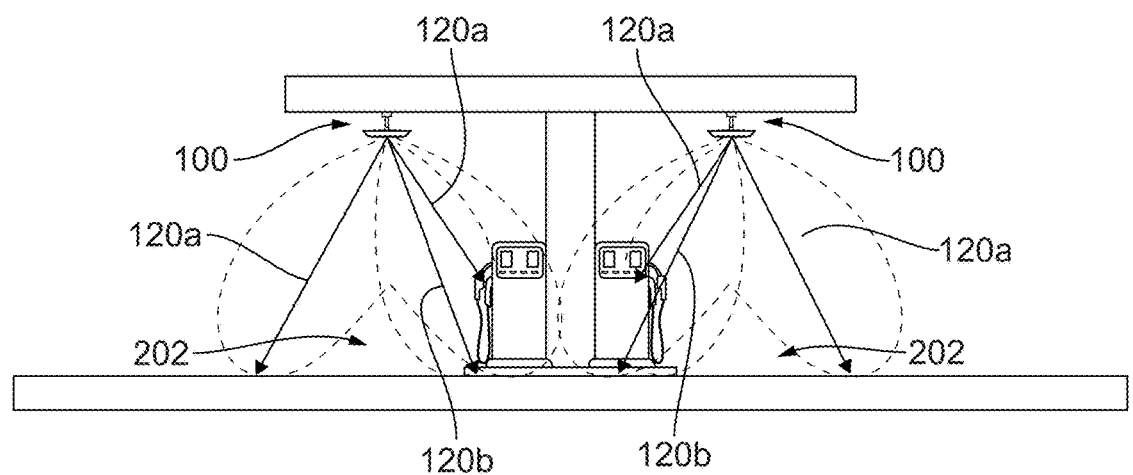
FIG. 10 illustrates a side elevation view of light projection patterns at two vehicle bays, each vehicle bay having a luminaire of FIG. 1.
Figure 11:
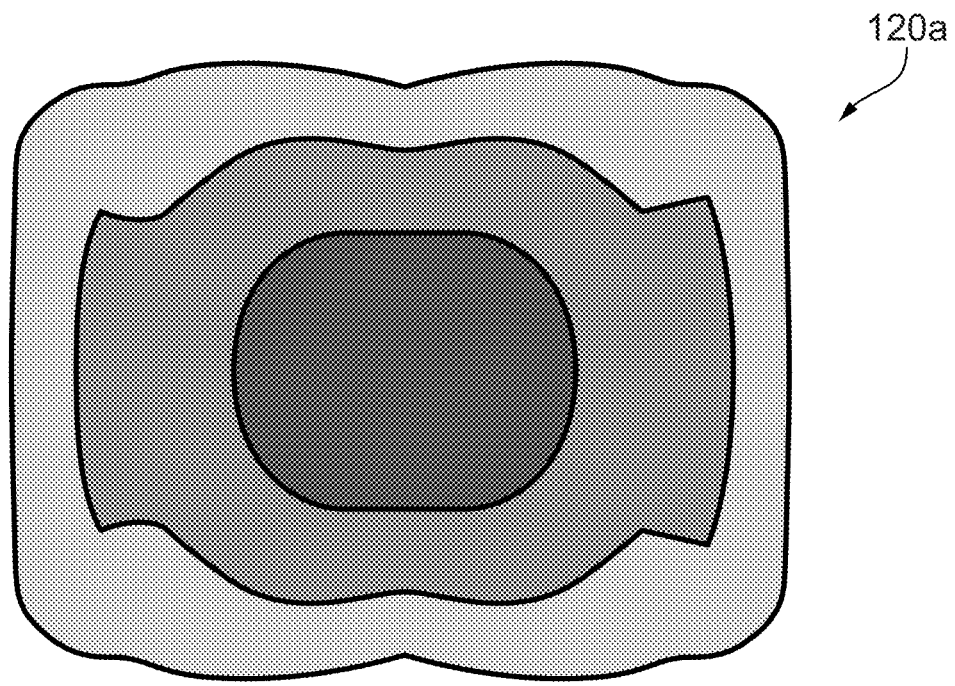
FIG. 11 illustrates a top plan view of a first light projection pattern of FIG. 10.
Figure 12:
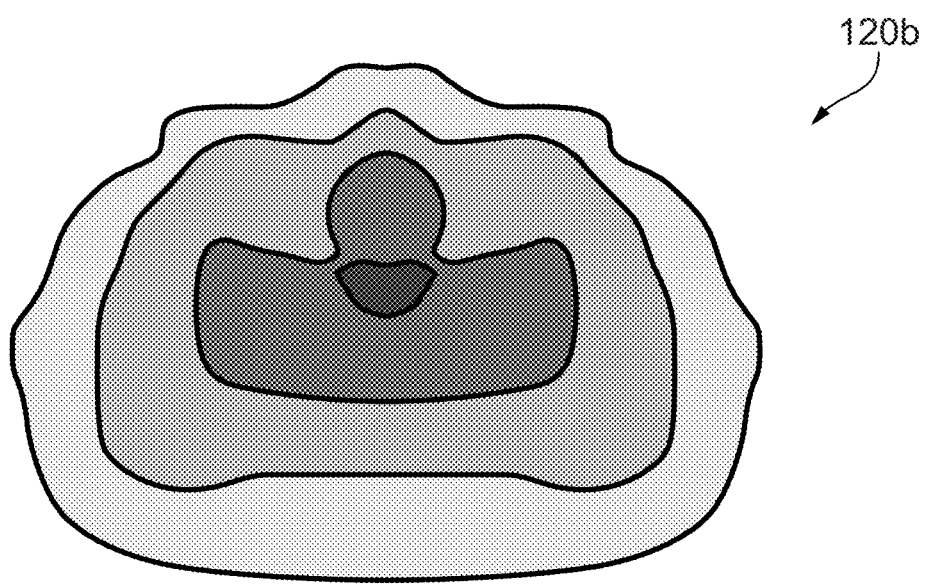
FIG. 12 illustrates a top plan view of a second light projection pattern of FIG. 10.

As shown in FIGS. 10-12, the luminaire 100 can be configured to spread light 120 in more than one pattern due at least in part to the two emission surface sections 112a, 112b. For example, the center emission surface section 112a can create a rectangular light emission pattern (as shown in FIG. 11) for general area lighting while the perimeter emission surface section 112b can create an asymmetric light emission pattern (as shown in FIG. 12) for illuminating the pump area at a gas station vehicle bay 202. In other embodiments, the light emission patterns are achievable by illuminating different light sources 118 of the plurality of light sources 118. The luminaire 100 can also be configured to adjust or alter the brightness, color, and/or temperature of the light 120 for signaling or adequate illumination purposes.

Figure 13:
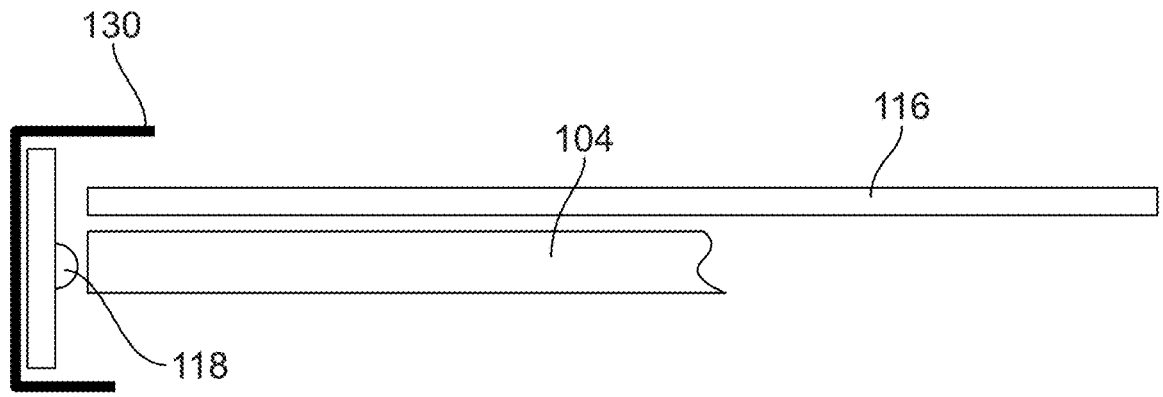
FIG. 13 illustrates a detailed cross-sectional elevation view of a portion of a luminaire, according to embodiments described herein.

Regardless of whether the light source 118 is located in an aperture or adjacent an outer edge of a light diffusion panel 104, the light source 118 projects light 120 into the light diffusion panel 104 to then be emitted through an emission surface 112. As shown in FIG. 13, some embodiments of the luminaire 100 further include a heat sink 130 to dissipate heat that is produced by the one or more light sources 118.

Figure 14:
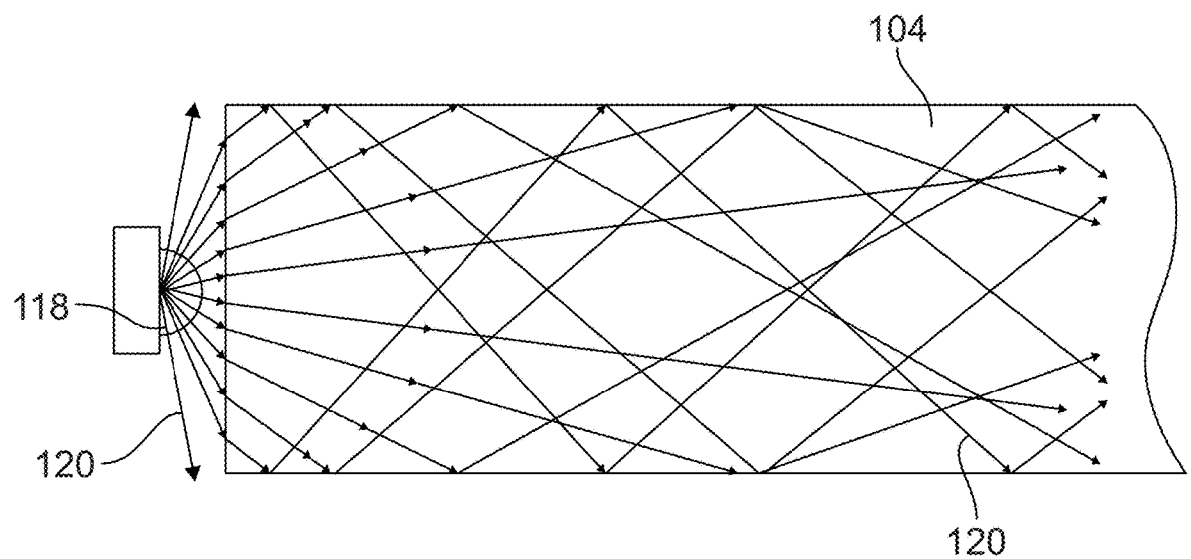
FIG. 14 illustrates a detailed cross-sectional elevation view of a portion of a luminaire, according to embodiments described herein.

With reference to FIG. 14, at least some of the light 120 projected from the light source 118 may escape around the periphery of the light diffusion panel 104. At least some of the light 120 that is projected into the light diffusion panel 104 reflects off of interior surfaces of the light diffusion panel 104 at an angle that exceeds a critical angle. This results in internal reflection of the light 120 within the light diffusion panel 104. The portions of the light diffusion panel 104 having no optical features 108 produce the most internal reflection of the light 120. These portions may be referred to as transition zones. The transition zones are typically unable to efficiently emit light and are, therefore, used to project the light into the emission surface sections 112.

Figure 15:
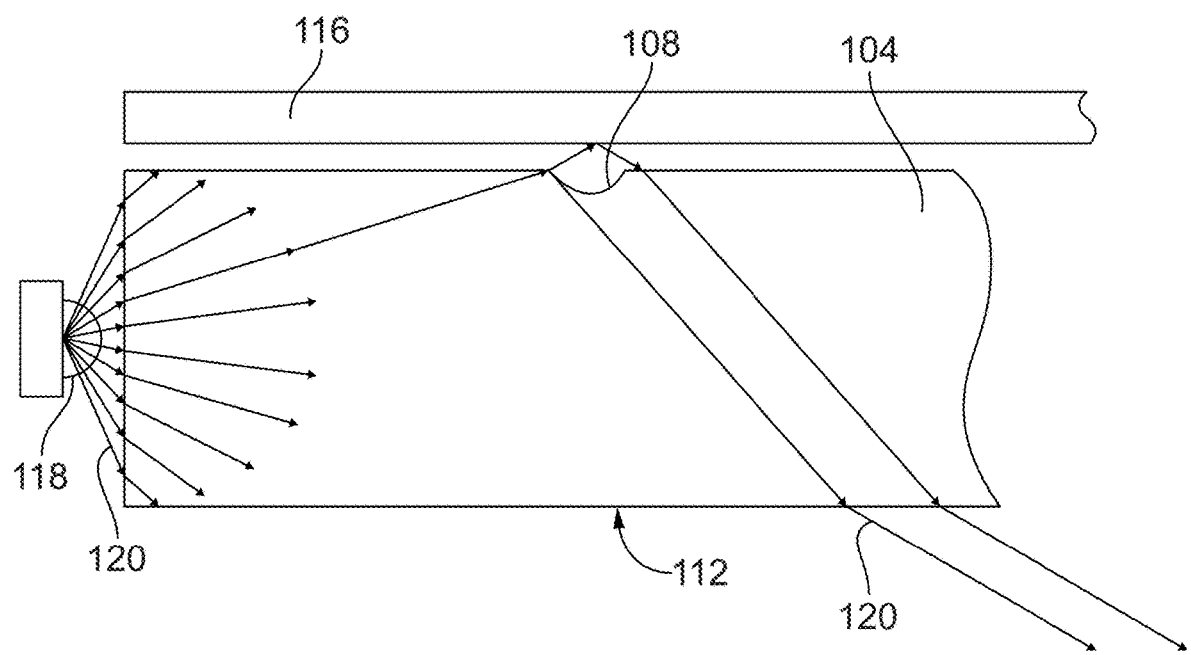
FIG. 15 illustrates a detailed cross-sectional elevation view of a portion of a luminaire, according to embodiments described herein.

As shown in FIG. 15, at least some of the light 120 encounters one or more optical features 108 (shown as a surface optical feature). The light 120 leaves the light source 118, travels through the transition zone of the light diffusion panel 104, and projects onto or through the optical feature 108. In the embodiment shown in FIG. 15, the light 120 is projected out of the light diffusion panel 104 through the surface optical feature 108 and is reflected off of the reflective surface 116 back into the light diffusion panel 104. Since the light 120 is at an angle of incidence that is much more aggressive due to the optical feature 108, the light 120 is able to escape the light diffusion panel 104 through the emission surface 112 instead of internally reflecting.

Figure 16:
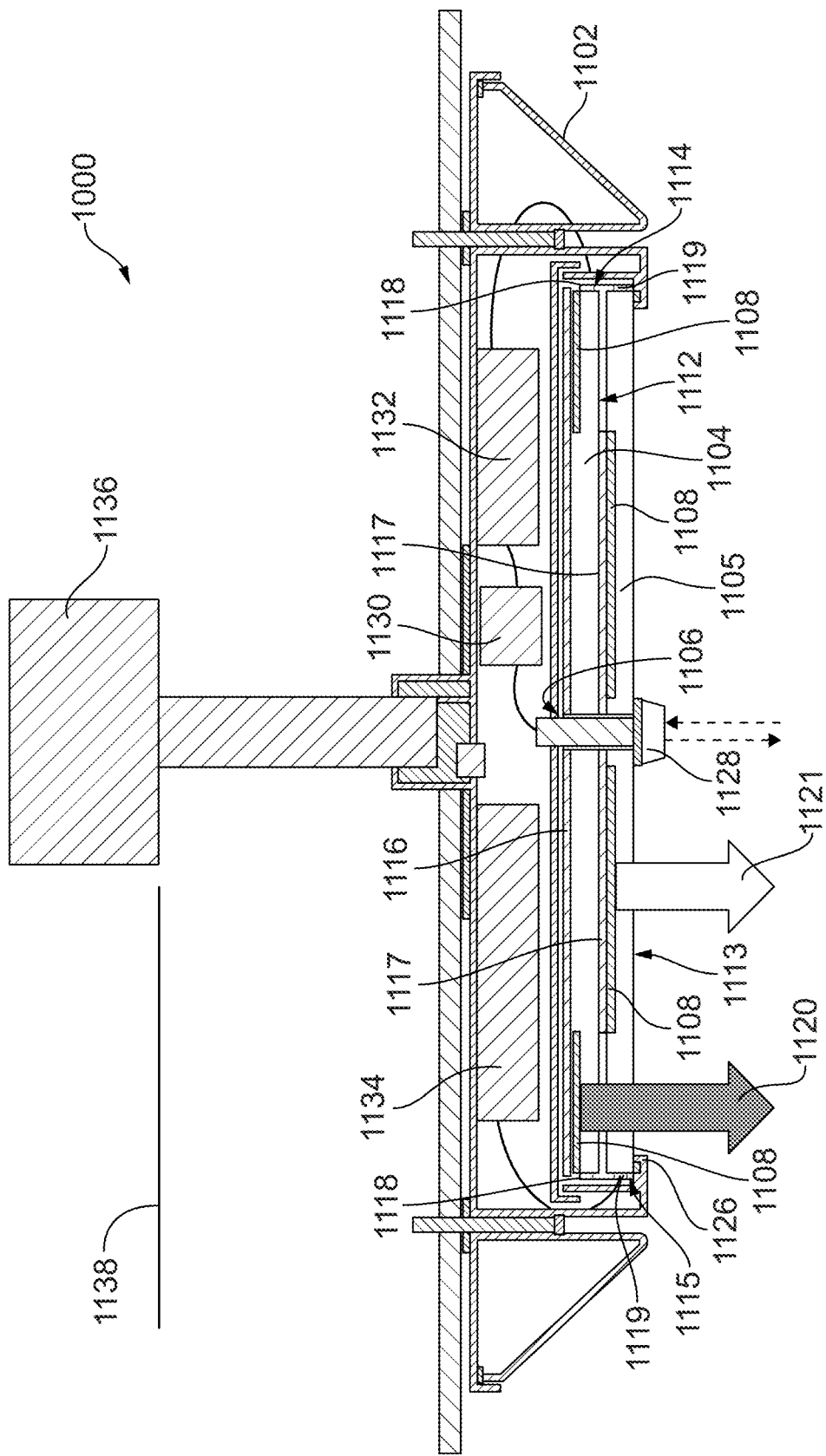
FIG. 16 illustrates a cross-sectional elevation view of a luminaire, according to embodiments described herein.

As shown in FIG. 16, another embodiment of a luminaire 1000 is shown. Many components of the luminaire 1000 are similar or identical to the luminaire 100 discussed above. As such, like components will have the same reference number as discussed above, but increased by a value of one thousand.

The luminaire 1000 includes a housing 1102 that at least partially contains a first light diffusion panel 1104 and a second light diffusion panel 1105, which may cooperate to form a multi-element light guide assembly (MLGA). In the illustrated embodiment of FIG. 16, the light diffusion panels 1104, 1105 are shown in a stacked configuration. The two or more light diffusion panels 1104, 1105 may be substantially parallel to each other.

In some embodiments, each of the light diffusion panels 1104, 1105 includes an aperture 1106 defined therein. The apertures 1106 receive, in the illustrated embodiment, one or more sensors 1128.

The light diffusion panels 1104, 1105 include laser-engraved or otherwise manufactured optical features 1108. The optical features 1108 are shown with shading in the form of hatching in FIG. 16. As discussed above, the optical features 1108 may be in the form of surface treatment of the light diffusion panels 1104, 1105 or may be within the light diffusion panels 1104, 1105.

The first light diffusion panel 1104 further includes a first panel emission surface 1112. Likewise, the second light diffusion panel 1105 further includes a second panel emission surface 1113. Each of the emission surfaces 1112, 1113 may have one or more emission sections, but the illustrated embodiment in FIG. 16 shows only one continuous emission surface 1112, 1113 for each respective light diffusion panel 1104, 1105.

The first light diffusion panel 1104 also includes a first panel outer periphery 1114. Similarly, the second light diffusion panel 1105 also includes a second panel outer periphery 1115. The light diffusion panels 1104, 1105 are shown in the illustrated embodiment as rectangular, but other shapes are also contemplated herein.

Also shown in FIG. 16, a first reflective surface 1116 is disposed in the housing 1102 adjacent the first light diffusion panel 1104. The first reflective surface 1116 is disposed opposite the first light diffusion panel 1104 from the first panel emission surface 1112. The first reflective surface 1116 may be affixed to the housing 1102, a surface of the housing 1102 itself, affixed to the first light diffusion panel 1104, trapped between the housing 1102 and the first light diffusion panel 1104, or the like. In the illustrated embodiment, the first reflective surface 1116 covers substantially all (or completely all) of the side of the first light diffusion panel 1104 opposite the first light diffusion panel 1104 from the first panel emission surface 1112.

A second reflective surface 1117 is disposed in the housing 1102 adjacent the second light diffusion panel 1105. The second reflective surface 1117 is disposed opposite the second light diffusion panel 1105 from the second panel emission surface 1113. The second reflective surface 1117 may be affixed to the second light diffusion panel 1105, affixed to the first light diffusion panel 1104, trapped between the light diffusion panels 1104, 1105, or the like. In the illustrated embodiment, the second reflective surface 1117 covers a majority of the side of the second light diffusion panel 1105 opposite the second light diffusion panel 1105 from the second panel emission surface 1113. Also in the illustrated embodiment, the second reflective surface 1117 does not cover the entire side of the second light diffusion panel 1105. Particularly, the illustrated embodiment includes a border area around the second light diffusion panel 1105 adjacent the second panel outer periphery 1115 that is without the second reflective surface 1117.

Also shown in FIG. 16, a plurality of first panel light sources 1118 projects light 1120 into the first light diffusion panel 1104 through the first panel outer periphery 1114. The plurality of first panel light sources 1118 is illustrated as being light sources that are configured to emit light of one or more particular colors. Particularly, the illustrated embodiment in FIG. 16 includes red, blue, and green light sources 1118. Of course, other embodiments include additional or alternative light sources 1118. The first panel light sources 1118 project light 1120 into the first light diffusion panel 1104 and out of the first light diffusion panel 1104 through the first panel emission surface 1112.

The luminaire 1000 further includes a plurality of second panel light sources 1119. Each second panel light source 1119 projects light 1121 into the second light diffusion panel 1105 through the second panel outer periphery 1115. The plurality of second panel light sources 1119 is illustrated as being light sources that are configured to emit white light. Of course, other embodiments include additional or alternative light sources 1119. The second panel light sources 1119 project light 1121 into the second light diffusion panel 1105 and out of the second light diffusion panel 1105 through the second panel emission surface 1112.

Because of the stacked configuration of the light diffusion panels 1104, 1105, the light 1120 that passes through the first panel emission surface 1112 also passes through the second light diffusion panel 1105 and through the second panel emission surface 1112. The total output of light 1120, 1121 from the luminaire 1000, therefore, is approximately the aggregate of the two or more light diffusion panels 1104, 1105. In such embodiments, the luminaire 1000 may include a reduced size or shape due to the size/shape no longer being limited by the number of the plurality of light sources 118a, 118b that can be arranged in a single plane.

Figure 17:
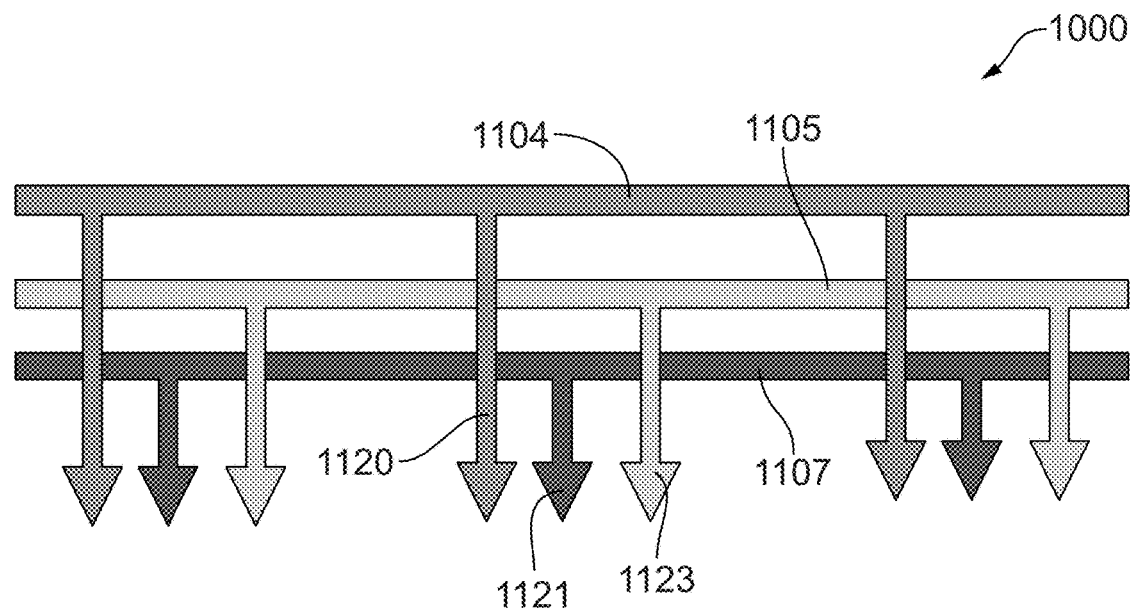
FIG. 17 schematically illustrates a detailed cross-sectional elevation view of light diffusion panels of a luminaire, according to embodiments described herein.

The positioning, size, and shape of the second reflective surface 1117 can impact how much of the light 1120 is able to pass through the second light diffusion panel 1105 and where on the second light diffusion panel 1105 the light 1120 is able to pass through. In some embodiments, the light 1120 is emitted at least partially (or even substantially) comingled with at least some of the light 1121 as the light 1120, 1121 projects thorough the second light diffusion panel 1105 and beyond the second panel emission surface 1113 (as shown in FIG. 17). In other embodiments, the second reflective surface 1117 is positioned such that the light 1120 is emitted substantially separately from the light 1121 through and beyond the second panel emission surface 1113.

Figure 18:
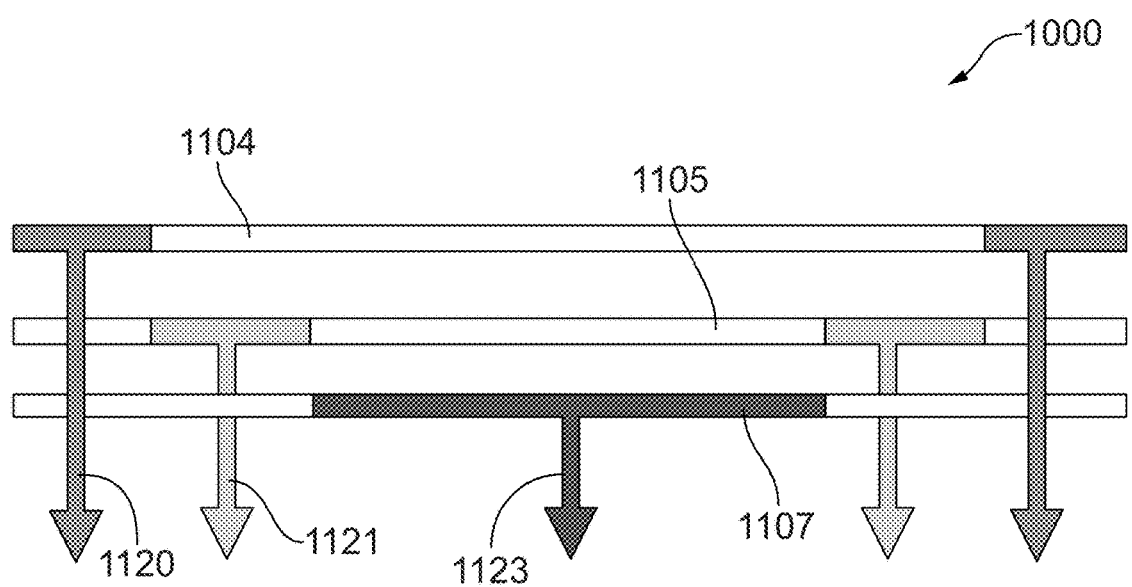
FIG. 18 schematically illustrates a detailed cross-sectional elevation view of light diffusion panels of a luminaire, according to embodiments described herein.

Additionally or alternatively, the location, size, and shape of each section of optical features 1108 in the plurality of light diffusion panels 1104, 1105, 1107 can allow light 1120, 1121, 1123 to transmit beyond the luminaire 1000 with minimal interference with each other (as shown in FIGS. 18 and 19). This capability allows for multiple functions including, for instance, photometric distribution, task lighting, indicator lighting, antimicrobial effects, or the like. This capacity also allows for multiple lighting characteristics including, for instance, varied spectral power, correlated color temperature, color quality, intensity, or the like.

In the illustrated embodiment of FIG. 16, the first and second panel light sources 1118, 1119 are mounted to the housing 1102, although some embodiments could have the light sources 1118, 1119 affixed to the respective light diffusion panels 1104, 1105. Further, the first and second light diffusion panels 1104, 1105 are retained in the housing 1102 in the illustrated embodiment by an outer edge 1126 of the housing 1102.

The sensor 1128 is illustrated as being mounted to a portion of the housing 1102, but it too could be mounted to one or both of the light diffusion panels 1104, 1105. In the embodiment of FIG. 16, the housing 1102 further includes a control module 1130, a first panel light source driver 1132, and a second panel light source driver 1134 disposed therein. These electrical components of the luminaire 1000 may be powered by a battery (not shown) disposed on or in the housing 1102, or they may be powered with mains electricity routed into the housing 1102 through a junction box 1136. The junction box 1136 is illustrated as being disposed above a canopy wall 1138 of a structure (such as a ceiling of a gas station canopy).

Figure 20:
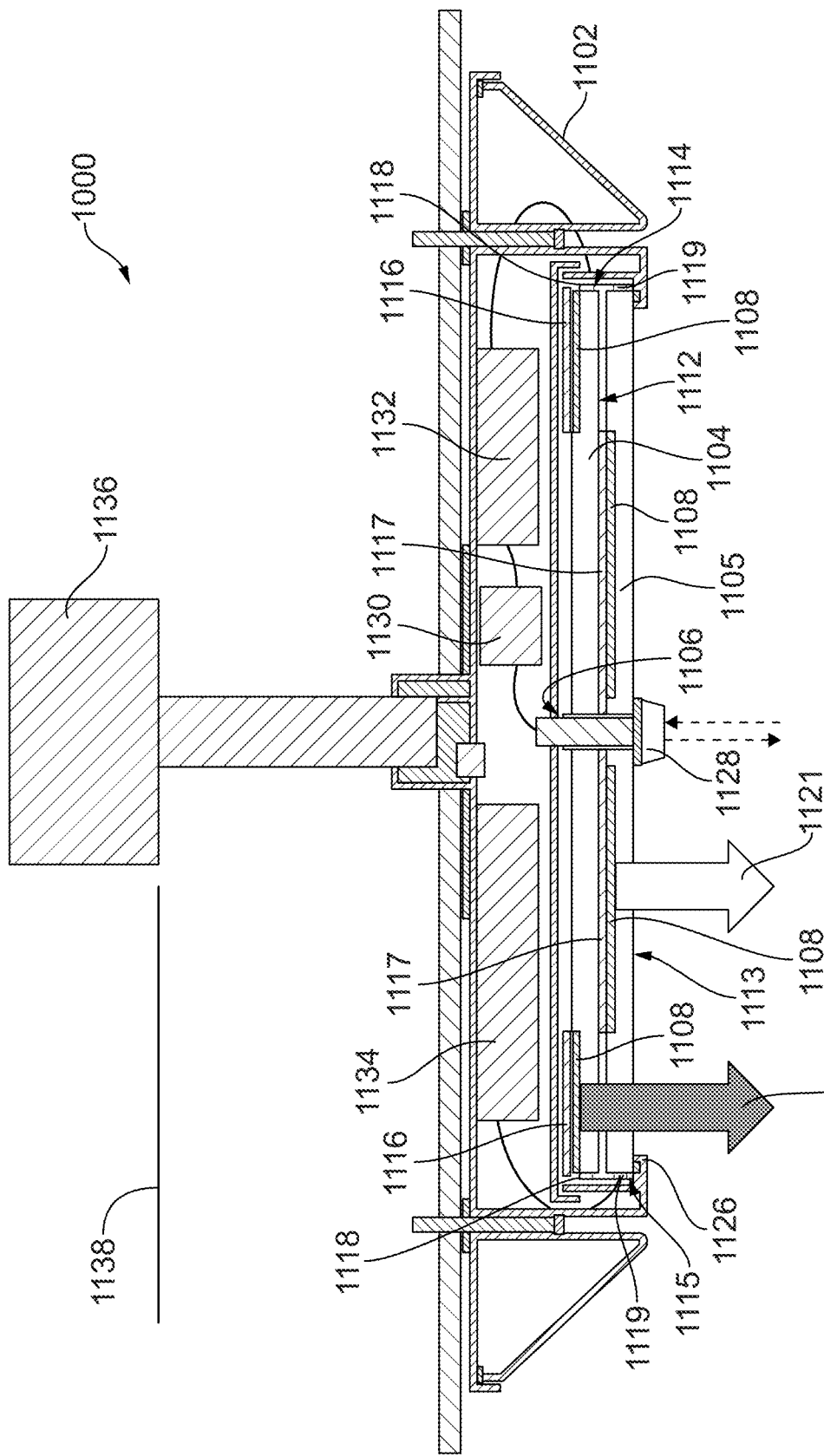
FIG. 20 illustrates a cross-sectional elevation view of a luminaire, according to embodiments described herein.

The embodiment of the luminaire 1000 shown in FIG. 20 is identical to that shown in FIG. 16, except the first reflective surface 1116 does not cover substantially all of the side of the first light diffusion panel 1104 opposite the first light diffusion panel 1104 from the first panel emission surface 1112. Instead, the embodiment illustrated in FIG. 20 relies on the total internal reflection of the first light diffusion panel 1104 to retain the light 1120 in the first light diffusion panel 1104 until the light escapes through the first panel emission surface 1112. Additionally or alternatively, the losses of light escaping through the side of the first light diffusion panel 1104 opposite the first light diffusion panel 1104 from the first panel emission surface 1112 may be considered negligible.

Figure 21:
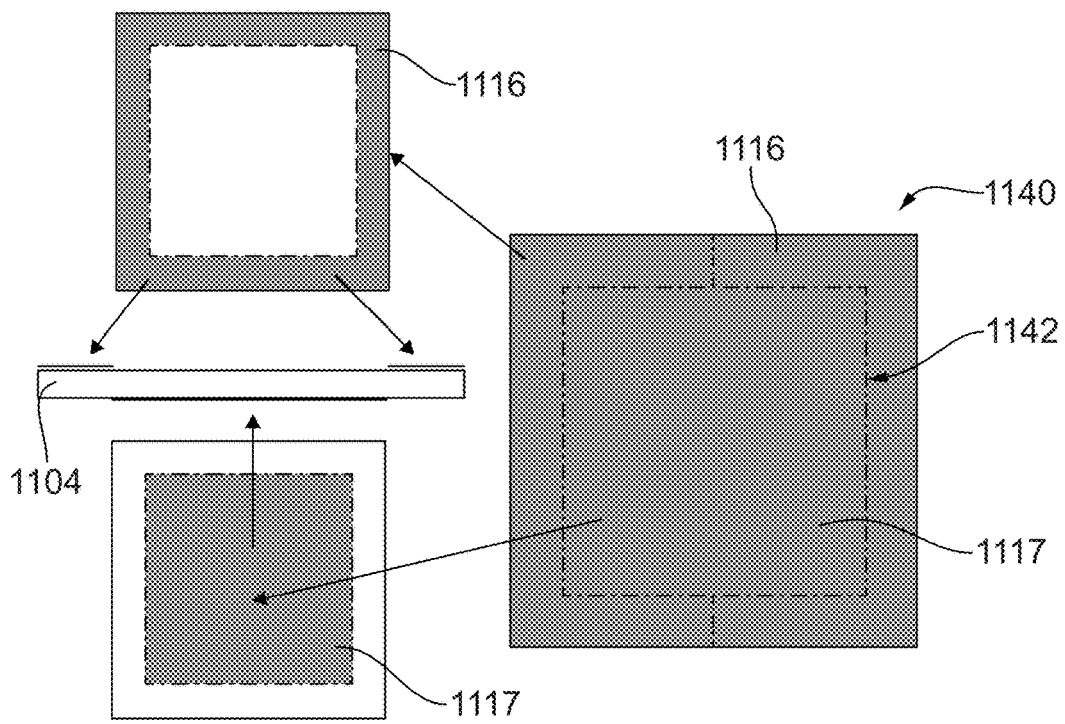
FIG. 21 illustrates an assembly schematic of affixing reflective layer material on a light diffusion panel of the luminaire of FIG. 20.

In some embodiments, the first and second reflective surfaces 1116, 1117 can be removed from a single sheet of reflective material. As shown in FIG. 21, a sheet of reflective material 1140 may include perforations 1142 for easy separation of the first reflective surface material 1116 from the second reflective surface material 1117. The sheet of reflective material 1140 may further include a layer of adhesive on one side, such that the first and second reflective surfaces 1116, 1117 can be easily affixed to one or both of the first and second light diffusion panels 1104, 1105. In the illustrated embodiment shown in FIG. 21, the first and second reflective surfaces 1116, 1117 are affixed to opposite sides of the first light diffusion panel 1104.

Figure 22:
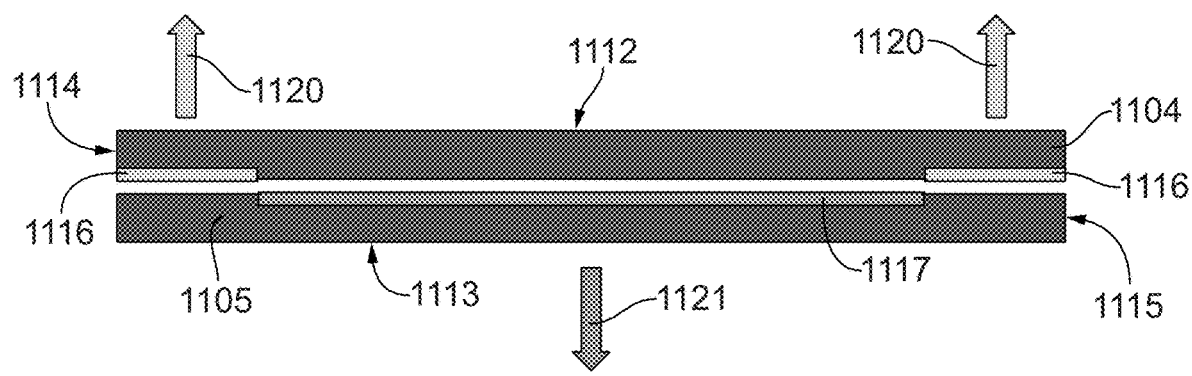
FIG. 22 illustrates an alternative assembly of two light diffusion panels for use with the luminaire of FIG. 1 or FIG. 20.

As shown in FIG. 22, the first reflective surface 116 can be disposed between the first light diffusion panel 1104 and the second light diffusion panel 1105 such that the first panel emission surface 1112 is an upper surface of the first light diffusion panel 1104. In this illustrated embodiment, the light 1120 is projected into the first light diffusion panel 1104 through the first panel outer periphery 1114 and upwardly out of the first panel emission surface 1112. This embodiment may be used to provide, for instance, recessed lighting for the luminaire 1000.

Figure 23:
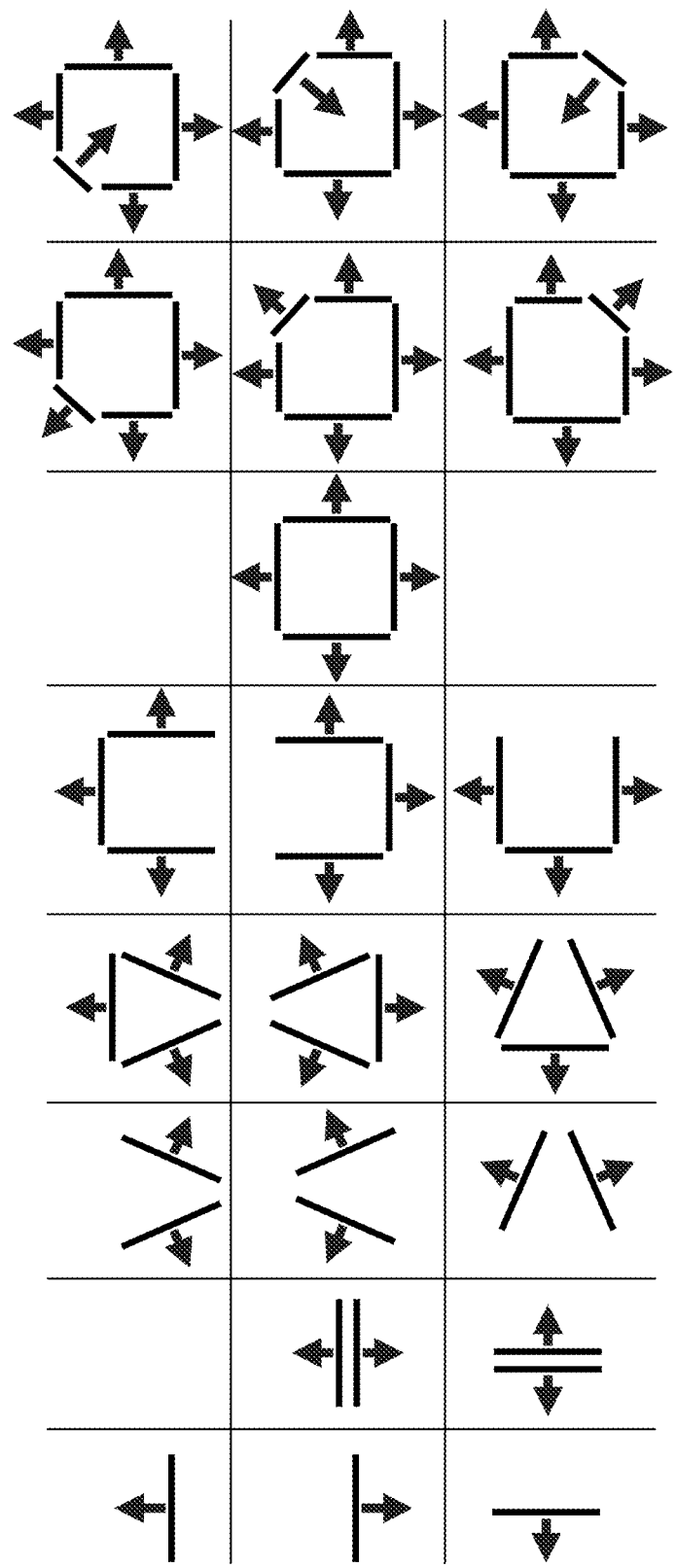
FIG. 23 schematically illustrates a cross-sectional view of examples of layouts of light diffusion panels of a luminaire, according to embodiments described herein.

Turning now to FIG. 23, although the luminaires 100, 1000 have been described above as relating to a canopy mounting location, the luminaires could also be mounted to a vertical wall of a structure as a wall sconce, hung from a ceiling as a pendant, mounted to a light pole, or the like. The luminaires could direct light of various characteristics in multiple directions as desired. As shown in FIG. 23, a plurality of light diffusion panels can cooperate to direct light in a variety of directions. Although only two-dimensional layouts of the light diffusion panels are shown in FIG. 23, these layouts are only meant to be examples. The light diffusion panels could be arranged in a three-dimensional layout to form a cube, pyramid, cylinder, or the like. As shown in some of the examples in FIG. 23, some of the layouts of the light diffusion panels may additionally or alternatively illuminate an interior space of the luminaire assembly.

The luminaires 100, 1000 discussed herein are capable of mixing light of various characteristics. Blue light can be combined with white light to create a white light having a different temperature than what might be accomplished by the white light alone. For instance, light with a temperature of 6500K can be emitted from the first light diffusion panel 1104 of the luminaire 1000, and light with a temperature of 2700K can be emitted from the second light diffusion panel 1105. These lights may be combined, may illuminate one at a time, or may do both in some sequence to create light having varying characteristics. Some embodiments may combine white light with high-intensity narrow-spectrum (HINS) light to provide adequate visual lighting that has the added benefit of killing at least some bacteria in the area. The constructions discussed above allow for one or more of the light sources to be powered by a battery backup system in case of emergencies. Different guide media can be used to vary the effect of the different light sources. Non-luminous or transmissive materials can be used for the housing or other components. Similarly, volumetric diffuse materials can be used for one or more components described above.

Figure 24:
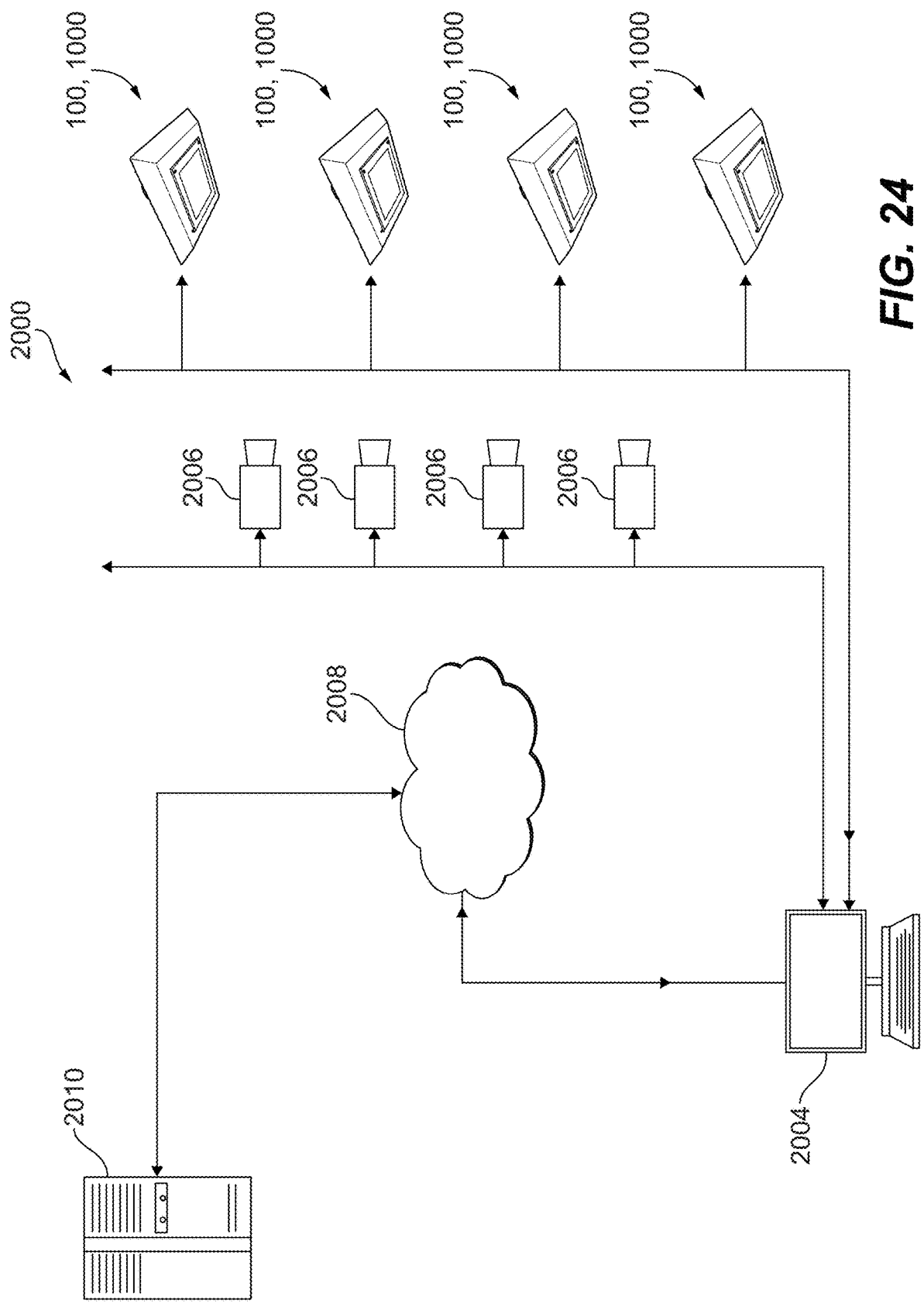
FIG. 24 schematically illustrates a system for indicating a status of a vehicle bay, according to embodiments described herein.
Figure 26:
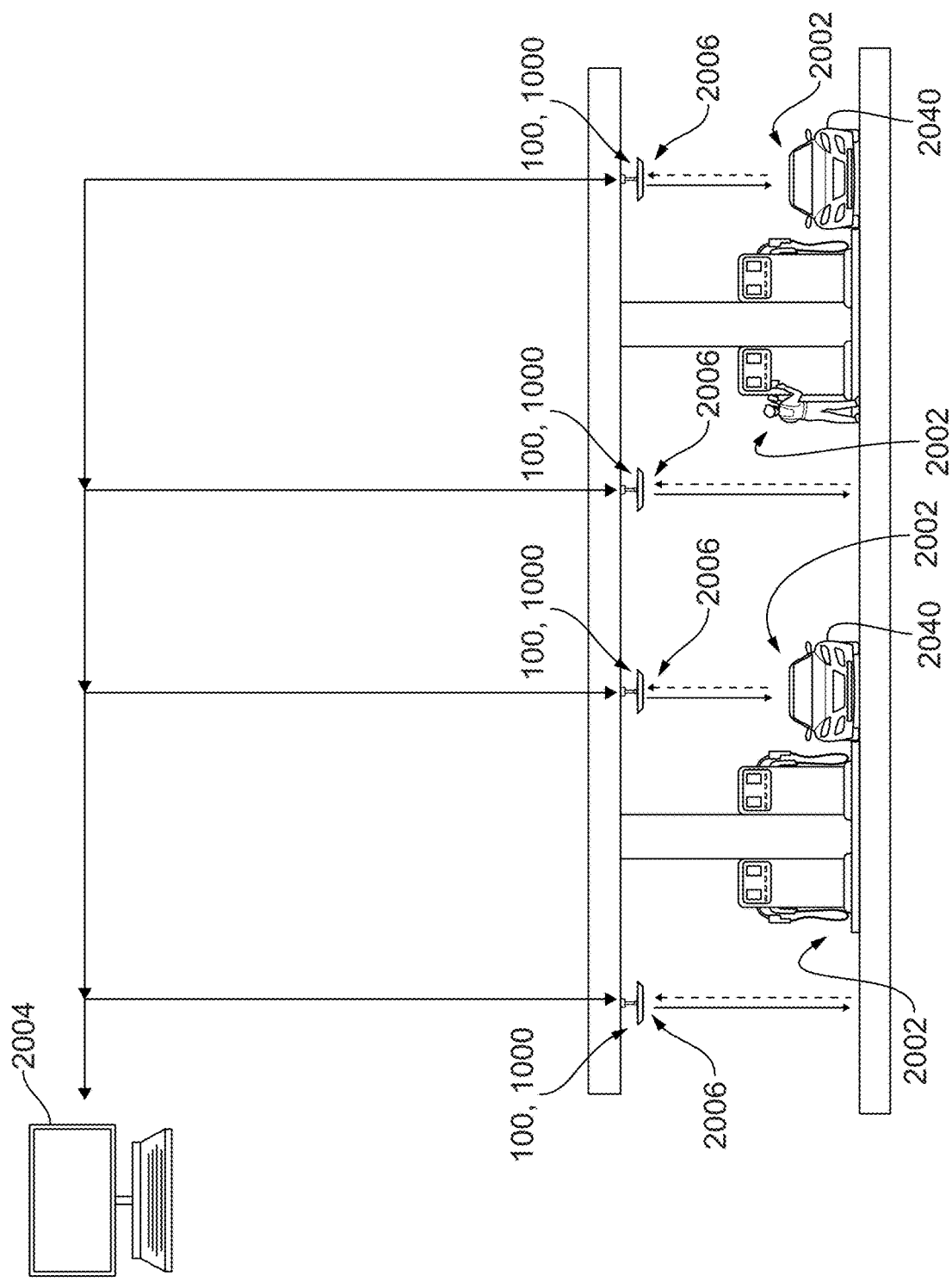
FIG. 26 schematically illustrates the user device in communication with the luminaires associated with respective vehicle bays, according to embodiments described herein.

FIG. 24 illustrates a system 2000 for indicating a status of a vehicle bay 2002 (shown in FIG. 26). Particularly, the system 2000 is capable of detecting as well as indicating the status of a vehicle bay 2002. The illustrated embodiment of the system 2000 includes a user device 2004, a luminaire 100 (and/or 1000), a sensor 2006 (and/or 128, 1128), a network 2008, and a server-side mainframe computer or server 2010. The user device 2004 includes, for example, a personal or desktop computer, a laptop computer, a tablet computer, or a mobile phone (e.g., a smart phone). The system 2000 is provided as an example and, in some embodiments, the system 2000 includes additional components. The system 2000 may include more than one user device 2004, server 2010, communication network 2008, or the like. The system 2000 may further include one or more sensors 2006 (and/or 128, 1128) and one or more luminaires 100 (and/or 1000). The system 2000 may include only the sensors 128 (and/or 1128) disposed on the respective luminaires 100 (and/or 1000). In some embodiments, however, the system 2000 may include additional sensors 2006 that are separate from the luminaires 100 (and/or 1000).

The user device 2004 is configured to communicatively connect to the server 2010 through the network 2008 and provide information to, or receive information from, the server 2010 related to the control or operation of the system 2000. The user device 2004 is also configured to communicatively connect to the luminaires 100 (and/or 1000) and the sensors 2006 (and/or 128, 1128) to provide information to, or receive information from, the luminaires 100 (and/or 1000) and sensors 2006 (and/or 128, 1128). The connections between the user device 2004 and the luminaires 100 (and/or 1000) and sensors 206 (and/or 128, 1128) are, for example, wired connections, wireless connections, or a combination of wireless and wired connections. Similarly, the connections between the server 2010 and the network 2008 are wired connections, wireless connections, or a combination of wireless and wired connections.

The network 2008 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 2008 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 25:
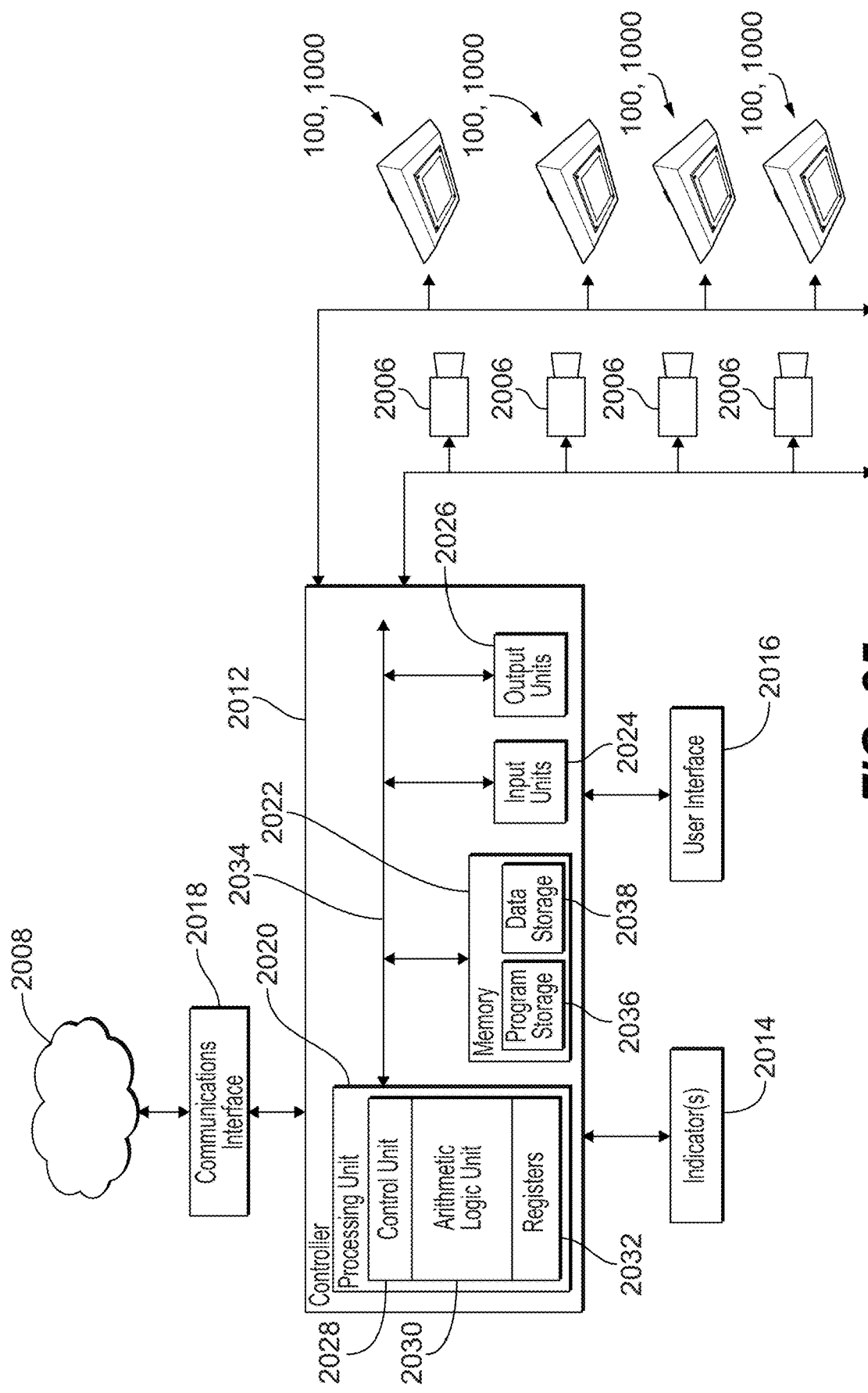
FIG. 25 schematically illustrates a controller to be used in the system of FIG. 24.

FIG. 25 illustrates a controller 2012 for the system 2000. The controller 2012 is electrically and/or communicatively connected to a variety of modules or components of the system 2000. For example, the illustrated controller 2012 is connected to one or more indicators 2014 (e.g., LEDs, a liquid crystal display ["LCD"], etc.), a user input or user interface 2016 (e.g., a user interface of the user device 2004 in FIG. 24), and a communications interface 2018. The controller 2012 is also connected to the sensors 2006 and the luminaires 100 (and/or 1000). The communications interface 2018 is connected to the network 2008 to enable the controller 2000 to communicate with the server 2010. The controller 2012 includes combinations of hardware and software that are operable to, among other things, control the operation of the system 2000, control the operation of the luminaires 100 (and/or 1000), control the operation of the sensors 2006 (and/or 128, 1128), receive one or more signals from the sensors 2006 (and/or 128, 1128), communicate over the network 2008, receive input from a user via the user interface 2016, provide information to a user via the indicators 2014, etc. In some embodiments, the indicator 2014 and the user interface 2016 may be integrated together in the form of, for instance, a touch-screen.

In the embodiment illustrated in FIG. 25, the controller 2012 would be associated with the user device 2004. As a result, the controller 2012 is illustrated in FIG. 25 as being connected to the luminaires 100 (and/or 1000) and the sensors 2006 (and/or 128, 1128). In other embodiments, the controller 2012 can provide control signals directly to the luminaires 100 (and/or 1000) and the sensors 2006 (and/or 128, 1128). In other embodiments, the controller 2012 is associated with the server 2010 and communicates through the network 2008 to provide control signals to the luminaires 100 (and/or 1000) and the sensors 2006 (and/or 128, 1128).

The controller 2012 includes a plurality of electrical and electronic components that provide power, operational control, and protection to the components and modules within the controller and/or the system. For example, the controller 2012 includes, among other things, a processing unit 2020 (e.g., a microprocessor, a microcontroller, or another suitable programmable device), a memory 2022, input units 2024, and output units 2026. The processing unit 2020 includes, among other things, a control unit 2028, an arithmetic logic unit ("ALU") 2030, and a plurality of registers 2032 (shown as a group of registers 2032 in FIG. 25), and is implemented using a known computer architecture (e.g., a modified Harvard architecture, a von Neumann architecture, etc.). The processing unit 2020, the memory 2022, the input units 2024, and the output units 2026, as well as the various modules or circuits connected to the controller 2012 are connected by one or more control and/or data buses 2034 (e.g., common bus). The control and/or data buses 2034 are shown generally in FIG. 25 for illustrative purposes. The use of one or more control and/or data buses 2034 for the interconnection between and communication among the various modules, circuits, and components would be known to a person skilled in the art in view of the disclosure described herein.

The memory 2022 is a non-transitory computer readable medium and includes, for example, a program storage area 2036 and a data storage area 2038. The program storage area 2036 and the data storage area 2038 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 2020 is connected to the memory 2022 and executes software instructions that are capable of being stored in a RAM of the memory 2022 (e.g., during execution), a ROM of the memory 2022 (e.g., on a generally permanent basis), or another non-transitory computer readable medium such as another memory or a disc. Software included in the implementation of the system 2000 and controller 2012 can be stored in the memory 2022 of the controller 2012. The software includes, for example, firmware, one or more applications, program data, filters, rules, one or more program modules, and other executable instructions. The controller 2012 is configured to retrieve from the memory 2022 and execute, among other things, instructions related to the control processes and methods described herein. In other embodiments, the controller 2012 includes additional, fewer, or different components.

The user interface 2016 is included to provide user control of the system 2000, the luminaires 100 (and/or 1000), and/or the sensors 2006 (and/or 128, 1128). The user interface 2016 is operably coupled to the controller 2012 to control, for example, drive signals provided to the luminaires 100 (and/or 1000) and/or drive signals provided to the sensors 2006 (and/or 128, 1128). The user interface 2016 can include any combination of digital and analog input devices required to achieve a desired level of control for the system 2000. For example, the user interface 2016 can include a computer having a display and input devices, a touch-screen display, a plurality of knobs, dials, switches, buttons, faders, or the like.

The direct drive signals that are provided to the luminaires 100 (and/or 1000) and/or the sensors 2006 (and/or 128, 1128) are provided, for example, based on a user input received by the controller 2012 from the user interface 2016. The controller 2012 is also configured to receive one or more signals from the sensors 2006 related to scan data.

FIG. 26 illustrates an example of the luminaires 100 (and/or 1000), the sensors 2006 (and/or 128, 1128), and the user device 2004 of the system 2000 in a location with multiple vehicle bays 2002 (such as a gas station). The user device 2004 controls the luminaires 100 (and/or 1000) to illuminate in certain colors, patterns, lighting intensities, or the like (one or more lighting characteristics). The user may directly control the characteristics of the luminaires 100 (and/or 1000), or the luminaires 100 (and/or 1000) may change lighting characteristics according to a preprogrammed set of rules.

Figure 27:
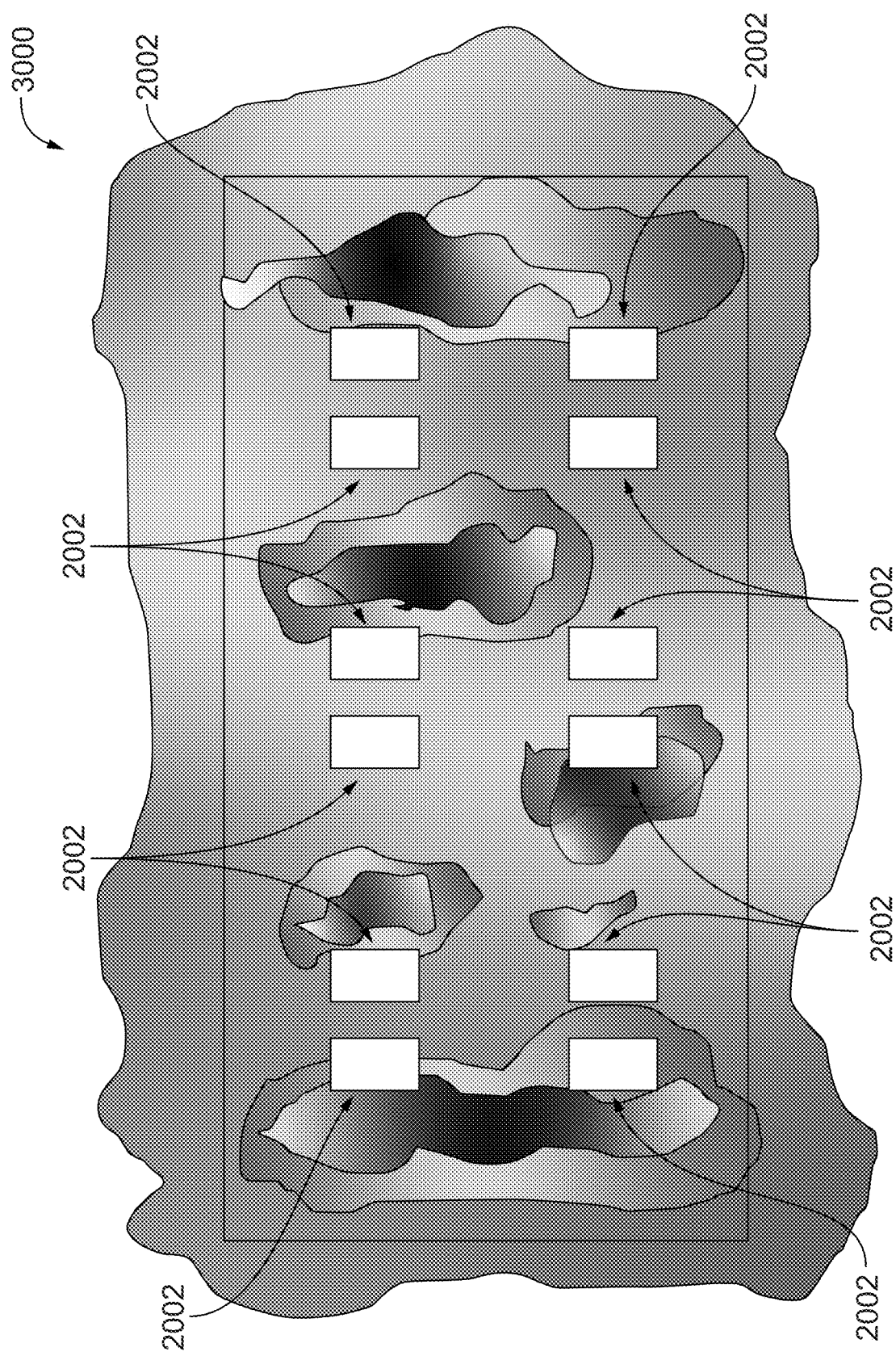
FIG. 27 illustrates a heat map representing vehicle dwell time in and around the vehicle bays, according to embodiments described herein.

FIG. 27 illustrates a heat map 3000 of an area including multiple vehicle bays 2002, such as a gas station. The heat map 3000 illustrates occupancy time of vehicles 2040 utilizing the gas station. Such information can be gathered with the sensors 2006 (and/or 128, 1128) and stored and/or processed by the controller 2012. The data may then be viewed by the user on the user interface 2016 and may be stored in the server 2010 for later viewing and/or processing.

Figure 28:
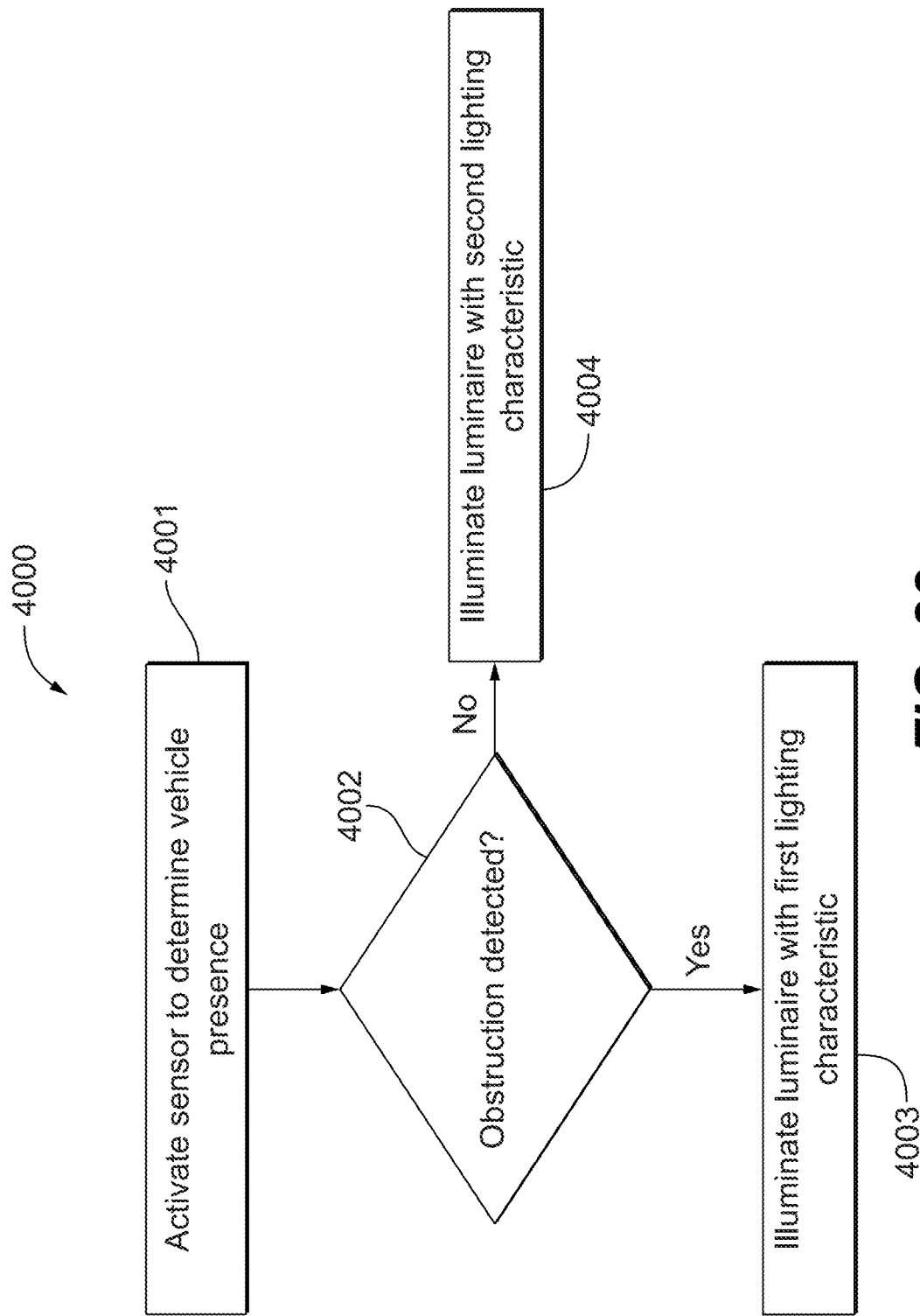
FIG. 28 illustrates a flowchart of an example method of operating a luminaire associated with a vehicle bay, according to embodiments described herein.

Embodiments described herein also relate to a method 4000 of operating a luminaire 100 (and/or 1000) associated with a vehicle bay 2002. Particularly, the flowchart illustrated in FIG. 28 is an embodiment of the method 4000 utilizing the system 2000 described above. The method 4000 includes activating one or more of the sensors 2006 (and/or 128, 1128) to determine if a vehicle 2040 is currently occupying the vehicle bay 2002 (at block 4001). As described above, the sensors 2006 (and/or 128, 1128) to detect the presence of a vehicle 2040 may be LiDAR sensors that measure time of flight from the sensor 2006 (and/or 128, 1128), to the surface below the sensor 2006 (and/or 128, 1128), and back to the sensor 2006 (and/or 128, 1128).

The method 4000 proceeds with inquiring whether the sensor 2006 (and/or 128, 1128) detected a vehicle 2040 or other obstruction in the vehicle bay 2002 (at block 4002). If the infrared light (regarding embodiments including an IR sensor) reaches the ground and returns to the sensor 2006 (and/or 128, 1128), the controller 2012 interprets this information as meaning there is no vehicle 2040 present in the vehicle bay 2002. If the infrared light instead hits a vehicle 2040 prior to reaching the ground and returns to the sensor 2006 (and/or 128, 1128) faster than would otherwise occur, the controller 2012 interprets this information as meaning there is a vehicle 2040 present in the vehicle bay 2002.

If an obstruction 2040 is detected by the one or more sensors 2006 (and/or 128, 1128), the controller 2012 then illuminates the luminaire 100 (and/or 1000) with a first lighting characteristic (at block 4003). This first lighting characteristic may be, for example, a red light, a flashing light, a bright light, some combination thereof, or the like.

If no obstruction 2040 is detected by the one or more sensors 2006 (and/or 128, 1128), the controller 2012 then illuminates the luminaire 100 (and/or 1000) with a second lighting characteristic (at block 4004). This second lighting characteristic may be, for example, a green light, a solid light, a dim light, some combination thereof, or the like.

In some embodiments, the system 2000 further includes an override mode for the luminaires 100 (and/or 1000). In the override mode, the user may control the luminaires 100 (and/or 1000) to illuminate with a third lighting characteristic. This override mode may be designated for a set amount of time, or the override mode may be set until the user returns the system 2000 to a normal detection mode (described above). The third lighting characteristic may be, for example, a blue light, a flashing light, a dimming and then brightening light, some combination thereof, or the like.

In the override mode, the sensors 2006 (and/or 128, 1128) may still be operational. In such embodiments, the controller 2012 can change the third lighting characteristic when an obstruction (such as a vehicle) 2040 is detected in the vehicle bay 2002. For instance, the third lighting characteristic can typically be a solid blue light, but can flash blue light on and off when a vehicle 2040 is present in the vehicle bay 2002.

Thus, embodiments described herein provide, among other things, luminaires, systems, and methods for illuminating, for instance, a vehicle bay. Various features and advantages are set forth in the following claims.

What is claimed is:

1. A luminaire comprising:
a housing;
a light diffusion panel disposed in the housing, the light diffusion panel including one or more light source apertures defined therein,
each light source aperture bounded by a respective edge surface, and
an emission surface, the emission surface including a first emission surface section and a second emission surface section, the second emission surface section disposed on an opposite side of the light source aperture from the first emission surface section, a majority of the first emission surface section being bordered by the one or more light source apertures;
a reflective surface disposed on a side of the light diffusion panel opposite the emission surface; and
a plurality of light sources projecting light into the light diffusion panel through the edge surface of the light diffusion panel, the plurality of light sources including
a first light source projecting light into the light diffusion panel and out of the light diffusion panel through the first emission surface section, the light projecting from the first light source having a first characteristic, and
a second light source projecting light into the light diffusion panel and out of the light diffusion panel through the second emission surface section the light projecting from the second light source having a second characteristic, the second characteristic being different from the first characteristic.

2. The luminaire of claim 1, further comprising a plurality of optical features disposed between the emission surface and the reflective surface.

3. The luminaire of claim 2, wherein the optical features are disposed within the light diffusion panel.

4. The luminaire of claim 2, wherein the optical features are disposed on a surface of the light diffusion panel opposite the emission surface.

5. The luminaire of claim 1, further comprising a frame coupled to the housing, a portion of the frame projecting through the light source aperture, the plurality of light sources coupled to the portion of the frame.

6. The luminaire of claim 5, wherein the frame includes a support flange supporting a portion of the light diffusion panel.

7. The luminaire of claim 1, wherein the reflective surface is an interior surface of the housing.

8. The luminaire of claim 1, wherein the first emission surface section includes a rectangular section bordered by the one or more light source apertures.

9. The luminaire of claim 8, wherein the one or more light source apertures includes four light source apertures, each light source aperture forming a side of the rectangular section.

10. The luminaire of claim 9, wherein adjacent light source apertures of the four light source apertures do not meet at the corners of the rectangular section.

* * * * *